US012619940B2

(12) United States Patent
Ichimura et al.

(10) Patent No.: US 12,619,940 B2
(45) Date of Patent: May 5, 2026

(54) WORK ANALYSIS DEVICE

(71) Applicant: Panasonic Intellectual Property Management Co., Ltd., Osaka (JP)

(72) Inventors: Daijiroh Ichimura, Hyogo (JP); Hidehiko Shin, Osaka (JP); Tomokazu Ichiriki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 18/369,262

(22) Filed: Sep. 18, 2023

(65) Prior Publication Data

US 2024/0005256 A1     Jan. 4, 2024

Related U.S. Application Data

(63) Continuation of application No. PCT/JP2021/048251, filed on Dec. 24, 2021.

(30) Foreign Application Priority Data

Apr. 2, 2021    (JP) ................................. 2021-063604

(51) Int. Cl.
*G06Q 10/0639* (2023.01)
*G06Q 10/0633* (2023.01)

(52) U.S. Cl.
CPC ... *G06Q 10/06398* (2013.01); *G06Q 10/0633* (2013.01)

(58) Field of Classification Search
CPC .......................................... G06Q 10/00–40/00
(Continued)

(56) References Cited

U.S. PATENT DOCUMENTS 6,336,053 B1 * 1/2002 Beatty ................ G05B 19/4188
715/967
12,007,743 B2 * 6/2024 Atsumi .............. G06Q 10/0631
(Continued)

FOREIGN PATENT DOCUMENTS

JP       2013-117832      6/2013
JP       2020-52465       4/2020
(Continued)

OTHER PUBLICATIONS

International Preliminary Report on Patentability issued Oct. 3, 2023 in International (PCT) Application No. PCT/JP2021/048251.
(Continued)

*Primary Examiner* — Alan S Miller
(74) *Attorney, Agent, or Firm* — Wenderoth, Lind & Ponack, L.L.P.

(57)     ABSTRACT

A work analysis device is for generating information on works performed by at least one worker in a workplace, and includes: a storage configured to store map information indicating an area associated with each of the works; an acquisition circuitry configured to acquire position information including positions of the at least one worker at each time in the workplace; and a controller configured to: (ii) perform arithmetic processing to discriminate the works at each time based on the position information and the map information; (ii) generate probability information indicating a probability that a work associated with an area including positions of the at least one worker at each time in the map information is performed by the at least one worker based on the position information; and (iii) adjust the probability information according to work tendency information indicating a tendency for the at least one worker to perform the works.

14 Claims, 15 Drawing Sheets

(58) Field of Classification Search
USPC ............................................... 705/7.11–7.42
See application file for complete search history.

(56)                           References Cited

U.S. PATENT DOCUMENTS

| | | | | |
|---|---|---|---|---|
| 2009/0237499 A1* | 9/2009 | Kressel | .................. | G06V 20/64 |
| | | | | 348/E7.085 |
| 2010/0312606 A1* | 12/2010 | Gala | .................. | G06Q 10/1091 |
| | | | | 705/320 |
| 2016/0253618 A1* | 9/2016 | Imazawa | .......... | G06Q 10/06395 |
| | | | | 705/7.15 |
| 2020/0293972 A1* | 9/2020 | Arao | ...................... | G06V 40/20 |
| 2021/0178719 A1 | 6/2021 | Suzuki et al. | | |
| 2021/0225029 A1* | 7/2021 | Sato | .......................... | G06T 7/73 |
| 2023/0044842 A1* | 2/2023 | Sato | ....................... | G06Q 50/04 |
| 2023/0135715 A1* | 5/2023 | Swerdlow | .............. | H04W 4/10 |
| | | | | 379/218.01 |

FOREIGN PATENT DOCUMENTS

| | | |
|---|---|---|
| JP | 2020-91801 | 6/2020 |
| JP | 6777266 | 10/2020 |
| WO | 2018/042646 | 3/2018 |
| WO | 2019/064398 | 4/2019 |

OTHER PUBLICATIONS

International Search Report issued Apr. 5, 2022 in International (PCT) Application No. PCT/JP2021/048251.

* cited by examiner

| SECTION | WORK AREA | WORKS |
|---------|-----------|-------|
| Z1 | A1 | PACKING, BOX PREPARATION |
|  | A2 | PICKUP |
| ⋮ | ⋮ | ⋮ |

| WORKER | ASSIGNED SECTION |
|--------|------------------|
| W1 | Z2 |
| W2 | Z1 |
| W3 | ⋮ |

*Fig. 5A*

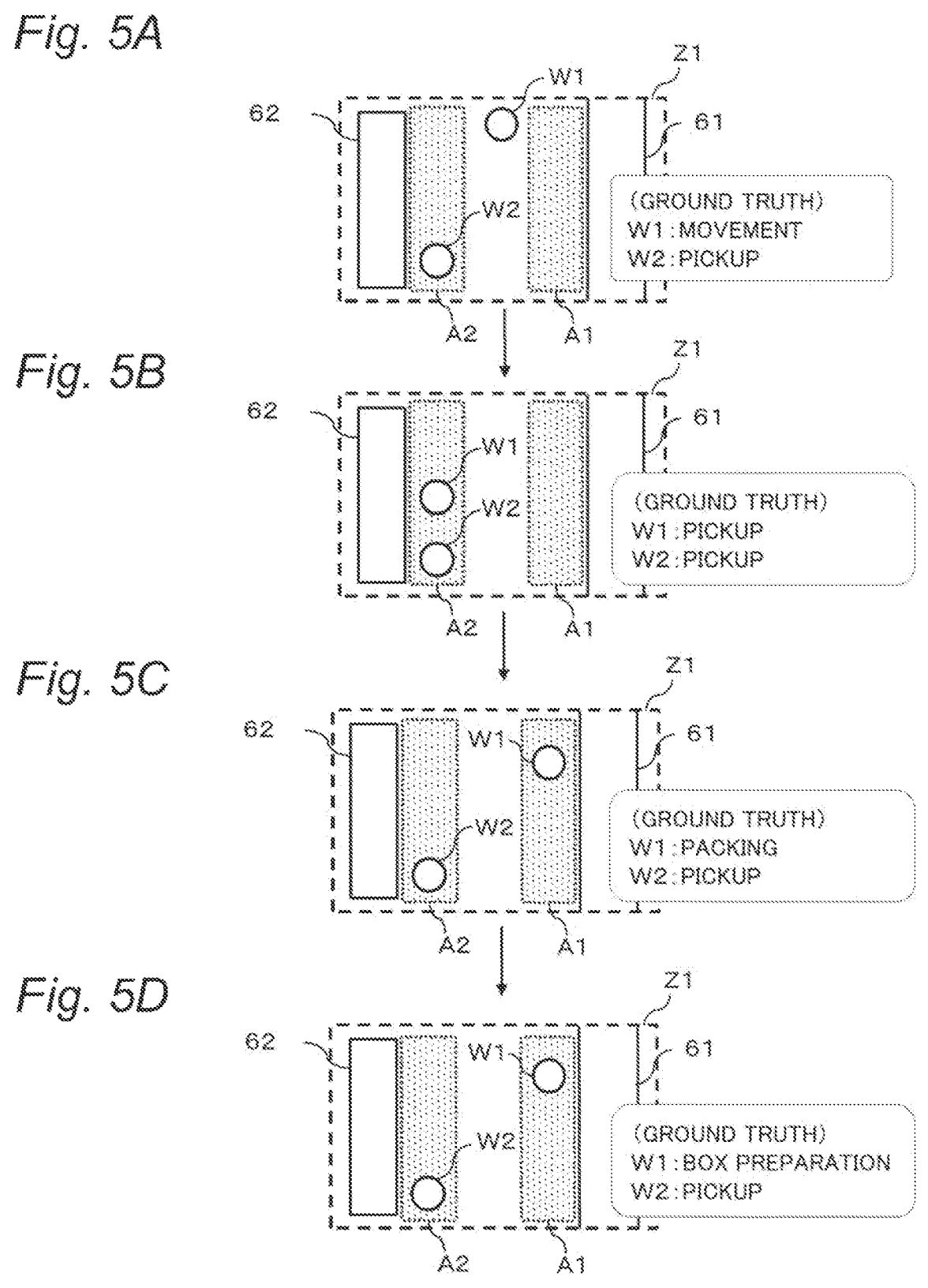

(GROUND TRUTH)
W1 : MOVEMENT
W2 : PICKUP

*Fig. 5B*

(GROUND TRUTH)
W1 : PICKUP
W2 : PICKUP

*Fig. 5C*

(GROUND TRUTH)
W1 : PACKING
W2 : PICKUP

*Fig. 5D*

(GROUND TRUTH)
W1 : BOX PREPARATION
W2 : PICKUP

|  | SECTION Z1 | | | |
|---|---|---|---|---|
|  | PACKING | BOX PREPARATION | PICKUP | MOVEMENT |
| MAXIMUM NUMBER OF WORKERS | 1 | 1 | – | – |
| W1 |  |  |  |  |
| W2 |  |  |  |  |

ALLOCATE PROBABILITIES (S13)

|  | SECTION Z1 | | | |
|---|---|---|---|---|
|  | PACKING | BOX PREPARATION | PICKUP | MOVEMENT |
| MAXIMUM NUMBER OF WORKERS | 1 | 1 | – | – |
| W1 | 50 | 50 | 0 | 0 |
| W2 | 50 | 50 | 0 | 0 |

ADJUSTMENT AMONG WORKERS (S15)

|  | SECTION Z1 | | | |
|---|---|---|---|---|
|  | PACKING | BOX PREPARATION | PICKUP | MOVEMENT |
| MAXIMUM NUMBER OF WORKERS | 1 | 1 | – | – |
| W1 | 30 | 70 | 0 | 0 |
| W2 | 70 | 30 | 0 | 0 |

*Fig. 10*

WORK ANALYSIS DEVICE

BACKGROUND

Technical Field

The present disclosure relates to a work analysis device and a work analysis method.

Background Art

WO 2019/064398 A discloses an analysis device that analyzes work contents during preparatory work time before the activating of a paper converting machinery. The analysis device of WO 2019/064398 A detects a working position of an operator of the paper converting machinery, and creates an action diagram of the operator based on a detection result. Furthermore, based on operation processing data and operation data of the paper converting machinery, the analysis device of WO 2019/064398 A creates a graph indicating a working time for each item, as a table indicating a work content in the preparation work time for each item, in such a manner that an operation content of the paper converting machinery and the work content of the operator corresponding thereto are separated from each other. In the analysis device of WO 2019/064398 A, an improvement item for improving production efficiency, such as an item whose working time is longer than a normal working time, is selected for a work process in the preparatory work time based on these creation results.

SUMMARY

The present disclosure provides a work analysis device capable of estimating work performed by one or more workers when the one or more workers perform a plurality of works.

A work analysis device according to an aspect of the present disclosure generates information on a plurality of works performed by one or more workers in a workplace. The work analysis device includes a storage, an acquisition circuitry, and a controller. The storage stores map information indicating an area associated with each of the works in the workplace. The acquisition circuitry acquires position information including the positions of the workers at each time in the workplace. The controller performs arithmetic processing to discriminate works of the workers at each time based on the position information and the map information. Based on the position information, the controller generates probability information indicating a probability that a work is performed by the workers, the work being associated with an area including positions of the workers at each time in the map information. The controller adjusts the probability information according to work tendency information indicating a tendency for workers to perform the works in the workplace.

These general and specific aspects may be implemented by a system, a method, a computer program, and a combination thereof.

According to the work analysis device and the work analysis method of the present disclosure, when one or more workers perform a plurality of works, it is possible to estimate the works performed by the workers.

BRIEF DESCRIPTION OF DRAWINGS

FIG. 1 is a diagram illustrating an outline of a work analysis system according to a first embodiment;

FIGS. 4A and 4B are diagrams for describing work area information and assignment information in the work analysis device;

FIGS. 5A to 5D are diagrams for describing a problem related to the work analysis device;

FIGS. 9A to 9C are diagrams for describing the work discrimination processing;

FIG. 10 is a flowchart illustrating processing for adjustment for each worker;

DETAILED DESCRIPTION

Figure 2:
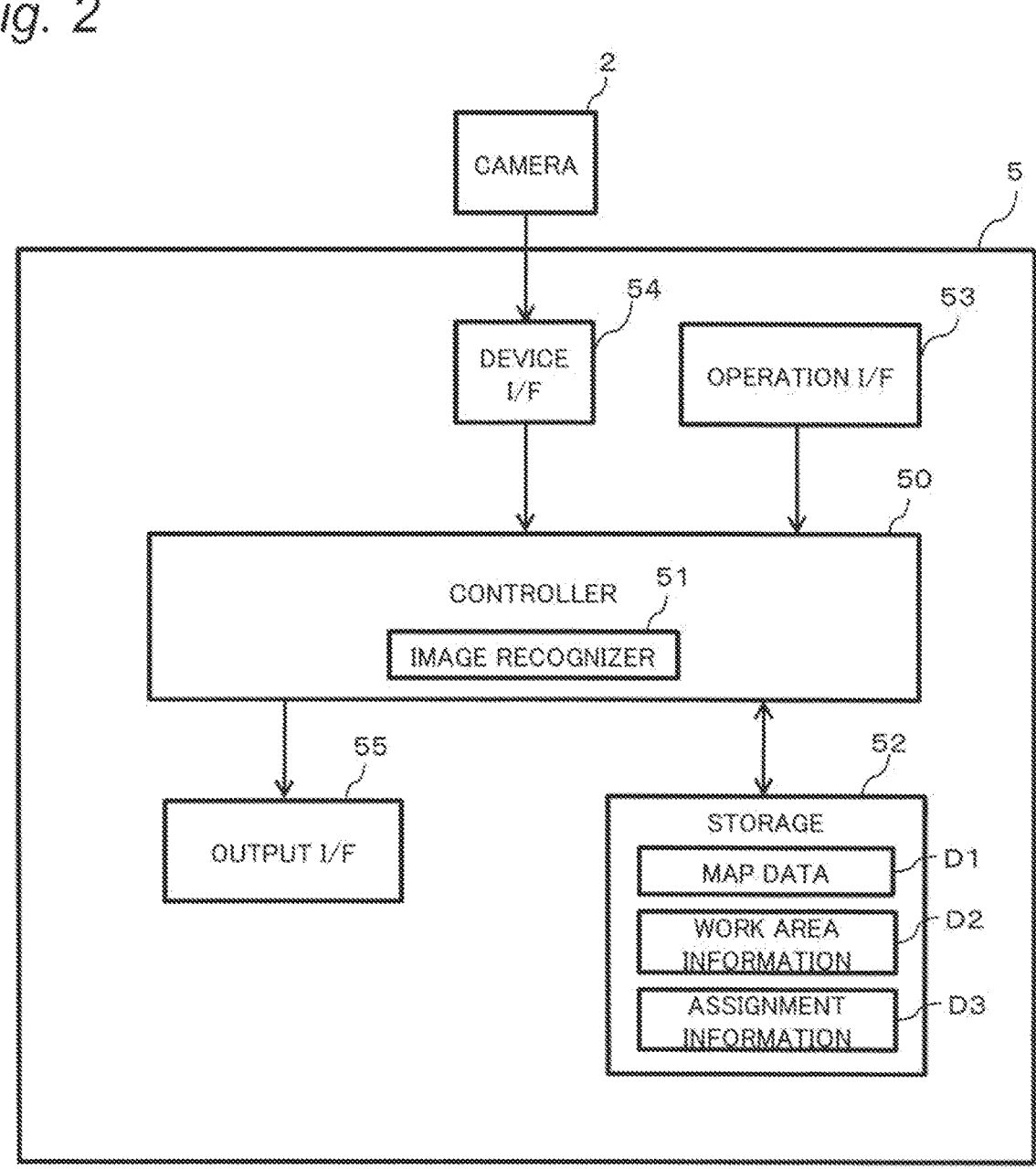
FIG. 2 is a block diagram illustrating a configuration of a work analysis device in the work analysis system.

In the following, an embodiment will be described in detail with reference to the drawings as appropriate. However, unnecessarily detailed descriptions will be omitted in some cases. For example, detailed descriptions of already well-known matters and repetition of descriptions of substantially the same configuration will be omitted in some cases. This is to prevent the following description from being unnecessary redundant and to facilitate those skilled in the art to understand the present disclosure. Note that the inventors provide the accompanying drawings and the following description in order for those skilled in the art to fully understand the present disclosure, and does not intend to limit the subject matter described in the claims by the accompanying drawings and the following description.

First Embodiment

1-1. Configuration

Figure 1:
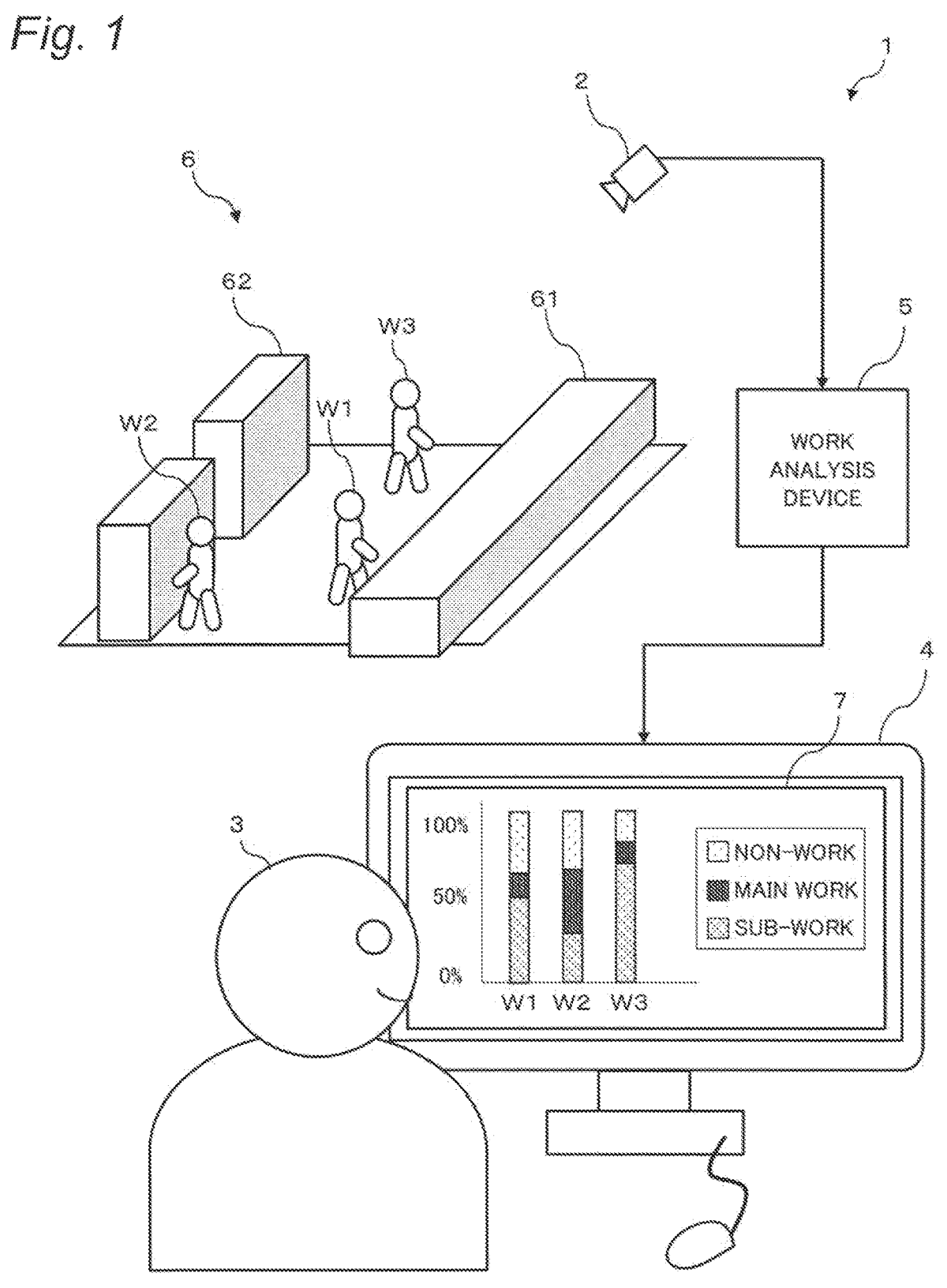

A work analysis system according to a first embodiment will be described with reference to FIG. 1. FIG. 1 is a diagram illustrating an outline of a work analysis system 1 according to the present embodiment.

1-1-1. System Overview

As illustrated in FIG. 1, the system 1 includes a camera 2 and a work analysis device 5. The system 1 is applied to analyze efficiency and the like of workers W1, W2, and W3 who perform a plurality of works in a workplace 6 such as a distribution warehouse. The system 1 may include a monitor 4 for presenting an analysis chart 7 regarding a predetermined analysis period to a user 3 such as an administrator or an analyst in the workplace 6, for example. The analysis period is a period to be analyzed by image recognition or the like using the camera 2 in the system 1, and is set in advance to a period ranging from one day to several months, for example.

In the example of FIG. 1, a conveyor line 61 and a shelf 62 are installed in the workplace 6. In the present example, the plurality of works, which are performed by each of the workers W1 to W3 moving in the workplace 6, includes "pickup" taking out products from the shelf 62, "packing" filling the products in boxes and putting the boxes on the conveyor line 61, and "box preparation" preparing the boxes.

The analysis chart 7 of the system 1 indicates a ratio of items classifying the works in the analysis period for each of the workers W1 to W3. Each work is classified into any of items including "main work", "sub-work", and "non-work" according to a magnitude of added value by the work, for example. In the example of FIG. 1, packing is the main work, while pickup, box preparation, movement toward the conveyor line 61 or the shelf 62, other auxiliary work, and the like related to the main work are sub-works. An idling state and the like that are not related to the main work are classified as non-work. As described above, the work to be analyzed in the work analysis device 5 is not limited to the main work and the sub-work, and includes the non-work.

According to the work analysis system 1 of the present embodiment, by presenting the analysis chart 7, the user 3 can analyze work contents of each of the workers W1 to W3 to consider improving work efficiency in the workplace 6, for example.

The camera 2 of the system 1 is arranged to capture an entire range in which the workers W1 to W3 move in the workplace 6, for example. The camera 2 repeats an imaging operation at a predetermined cycle in the workplace 6 to generate image data indicating a captured image, for example. The camera 2 is connected to the work analysis device 5 to enable transmission of the image data to the work analysis device 5, for example. Although one camera 2 is illustrated in FIG. 1, the camera 2 included in the system 1 is not limited to one camera, and may be two or more cameras.

The work analysis device 5 includes an information processing device such as a server device, for example. The work analysis device 5 is communicably connected to an external information processing device such as a PC including the monitor 4. A configuration of the work analysis device 5 will be described below with reference to FIG. 2.

1-1-2. Configuration of Work Analysis Device

FIG. 2 is a block diagram illustrating a configuration of the work analysis device 5. The work analysis device 5 illustrated in FIG. 2 includes a controller 50, a storage 52, an operation interface 53, a device interface 54, and an output interface 55. Hereinafter, the interface is abbreviated as an "I/F".

The controller 50 includes a CPU or an MPU that realizes a predetermined function in cooperation with software, and controls the overall operation of the work analysis device 5, for example. The controller 50, reading data and programs stored in the storage 52, performs various arithmetic processing to realize various functions. For example, the controller 50 includes an image recognizer 51 as a functional configuration.

The image recognizer 51 recognizes a position of a preset processing target such as the workers W1 to W3 in the image indicated by the image data by applying various image recognition technologies to the image data, and outputs a recognition result. The recognition result may include information indicating the time of capturing the image in which the position of the processing target is recognized, for example. The recognition result is an example of the position information in the present embodiment. For example, the image recognizer 51 performs image recognition processing using a learned model implemented with a neural network such as a convolutional neural network. The image recognition processing may be performed by various image recognition algorithms.

The controller 50 executes a program including a command group for realizing the function of the work analysis device 5, for example. The above program may be provided via a communication network such as the Internet, or may be stored in a portable recording medium. Furthermore, the controller 50 may include an internal memory as a temporary storage area to hold various data and programs.

The controller 50 may be a hardware circuit such as a dedicated electronic circuit designed to realize a predetermined function or a reconfigurable electronic circuit. The controller 50 may include various semiconductor integrated circuits such as a CPU, an MPU, a GPU, a GPGPU, a TPU, a microcomputer, a DSP, an FPGA, and an ASIC.

The storage 52 is a storage medium that stores programs and data necessary for implementing the functions of the work analysis device 5. The storage 52 includes a hard disk drive (HDD) or a semiconductor storage device (SSD), for example. For example, the storage 52 stores the above-described program, and various types of information such as map data D1, work area information D2, and assignment information D3.

The map data D1 indicates an arrangement of various facilities such as the conveyor line 61 and the shelf 62 in the workplace 6 in a predetermined coordinate system. The work area information D2 is information that associates a position in the workplace 6 with a work. The assignment information D3 is information indicating an assigned range for each of the workers W1 to W3 in the workplace 6. The map data D1 and the work area information D2 are examples of map information in the work analysis device 5 of the present embodiment. The assignment information D3 is an example of work tendency information in the work analysis device 5 of the present embodiment. Details of each piece of information will be described later.

The storage 52 may include a temporary storage element including, for example, a DRAM or an SRAM, and may function as a working area of the controller 50. For example, the storage 52 may temporarily store image data received from the camera 2, a recognition result by the image recognizer 51, and the like.

The operation I/F 53 is a general term for operation members that receive a user's operation. For example, the operation I/F 53 includes any of a keyboard, a mouse, a trackpad, a touchpad, a button, a switch, and the like, or a combination thereof. The operation I/F 53 acquires various types of information input by a user's operation.

The device I/F 54 is a circuit for connecting an external device such as the camera 2 to the work analysis device 5. The device I/F 54 performs communication according to a predetermined communication standard. The predetermined standard includes USB. HDMI (registered trademark), IEEE1395, IEEE802.11, Bluetooth (registered trademark), and the like. The device I/F 54 is an example of an acquisition circuitry that receives various information from an external device in the work analysis device 5. In the work analysis system 1, the work analysis device 5 acquires image data indicating a moving image captured by the camera 2 via the device I/F 54, for example.

The output I/F 55 is a circuit for outputting information. The output I/F 55 outputs a video signal or the like to an external display device such as a monitor and a projector for displaying various types of information in compliance with the HDMI standard, for example.

The configuration of the work analysis device 5 as described above is an example, and the configuration of the work analysis device 5 is not limited thereto. The work analysis device 5 may be configured by various computers including a personal computer (PC). In addition to or instead of the output I/F 55, the work analysis device 5 may include a display implemented with a liquid crystal display or an organic EL display as a built-in display device, for example. Furthermore, the work analysis method of the present embodiment may be executed in distributed computing.

Furthermore, in addition to or instead of the above configuration, the work analysis device 5 may have a configuration that communicates with an external information processing device via a communication network. For example, the operation I/F 53 may be configured to receive an operation by an external information processing device connected via a communication network. Furthermore, the output I/F 55 may transmit various types of information to an external information processing device via a communication network.

Furthermore, the acquisition circuitry in the work analysis device 5 may be realized by cooperation with various kinds of software in the controller 50 or the like. The acquisition circuitry in the work analysis device 5 may acquire various types of information by reading various types of information stored in various storage media (e.g., the storage 52) to the working area of the controller 50.

1-1-3. Various Data Structures

The work analysis device 5 of the present embodiment stores the map data D1, the work area information D2, and the assignment information D3 in the storage 52 as described above. An example of a structure of the various data D1, D2, and D3 will be described with reference to FIGS. 3, 4A and 4B.

Figure 3:
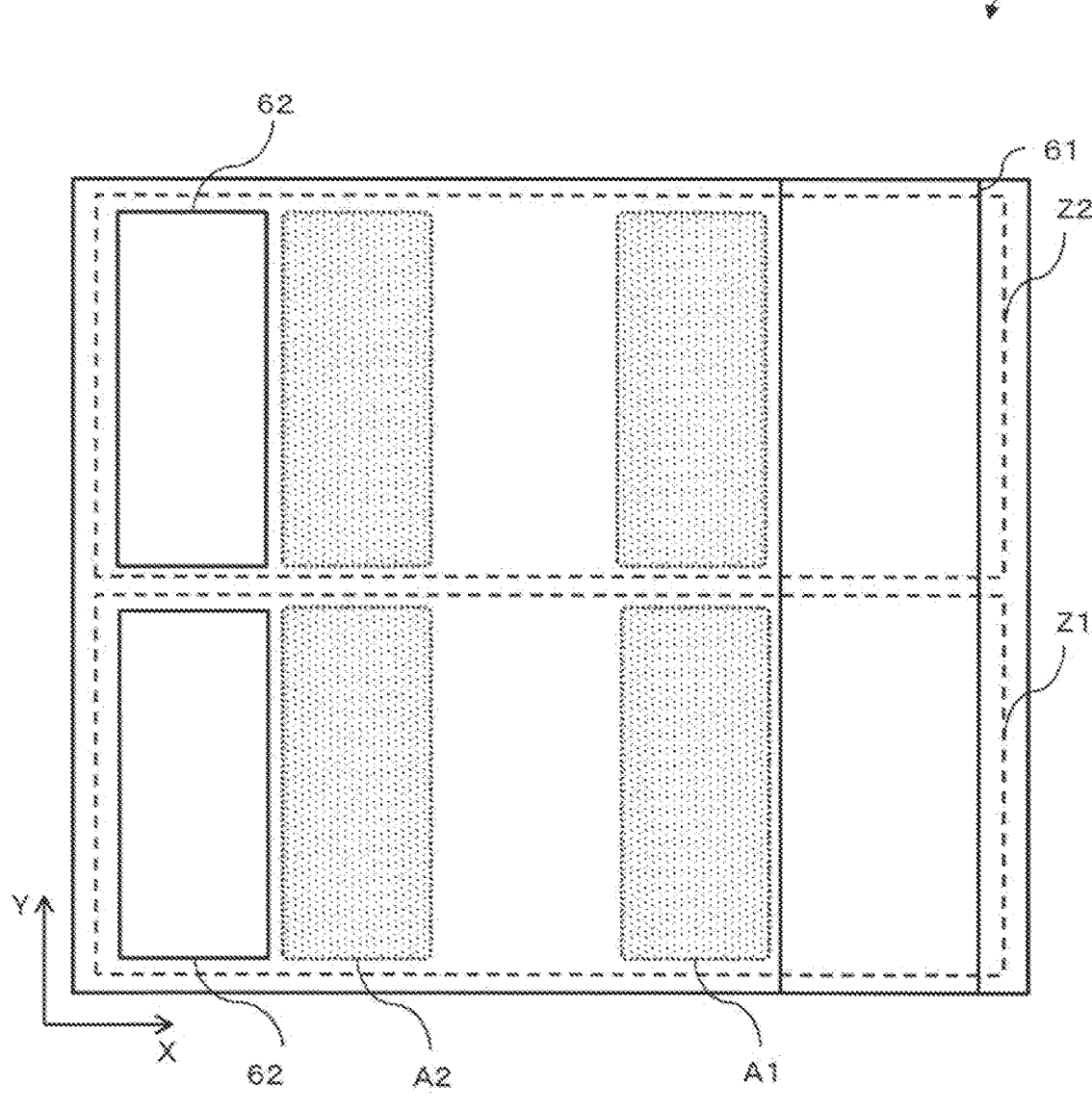
FIG. 3 is a diagram for describing map data in the work analysis device.

FIG. 3 is a diagram for describing the map data D1. For example, the map data D1 manages data indicating a coordinate system of a map, such as a layout of various facilities in the workplace 6 viewed from above, associating with the arrangement of sections and work areas which are described later. Hereinafter, two directions orthogonal to each other on a horizontal plane in the workplace 6 are referred to as an X direction and a Y direction. A position in the workplace 6 is defined by an X coordinate indicating a position in the X direction and a Y coordinate indicating a position in the Y direction, for example.

In the map data D1 of FIG. 3, the conveyor line 61 and the shelves 62 spaced along the X direction are illustrated in accordance with the workplace 6 illustrated in FIG. 1. In the example of FIG. 3, the conveyor line 61 extends in the Y direction, and conveys the box in a direction from positive to negative in the Y direction. The map data D1 of this example manages the workplace 6 by dividing the workplace 6 into a plurality of sections in the Y direction. FIG. 3 illustrates an example in which the workplace 6 is divided into a section Z1 and a section Z2. Each of the sections Z1 and Z2 is set in advance as a unit section to which a worker is assigned in the workplace 6, for example.

Each of the sections Z1 and Z2 includes a work area indicating an area where the workers W1 to W3 and the like work in the workplace 6. The section Z1 illustrated in FIG. 3 includes a work area A1 near the conveyor line 61 and a work area A2 near the shelf 62. Each of the work areas A1 and A2 is set in advance as an area within a range in which one or more works associated with the conveyor line 61 or the shelf 62 are expected to be performed in the workplace 6.

FIGS. 4A and 4B are diagrams for describing the work area information D2 and the assignment information D3 in the work analysis device 5 of the present embodiment.

For example, as illustrated in FIG. 4A, the work area information D2 manages the "work area" and the "works" performed in each work area associating with each other for each "section" in the workplace 6. For example, works of "packing" and "box preparation" are performed in the work area A1 near the conveyor line 61 of the section Z1, and work of "pickup" is performed in the work area A2 near the shelf 62 of the section Z1. The work analysis device 5 can manage the position and the work in the workplace 6 associating with each other by the work area information D2.

As illustrated in FIG. 4B, the assignment information D3 manages the "worker" and a "assigned section" associating with each other. The assigned section is a section where each worker mainly works, for example. In the example of FIG. 4B, the worker W1 is assigned to the section Z2, and the worker W2 is assigned to the section LI. The assignment information D3 may be sequentially updated according to information indicating worker assignment such as a work plan of each day in the workplace 6, for example. Furthermore, in the assignment information D3, a section frequently stayed may be set as the assigned section for each worker based on a past recognition result by the image recognizer 51, for example.

Although not illustrated, the work analysis device 5 according to the present embodiment stores the work tendency information regarding the workplace 6 in the storage 52 in addition to the above assignment information D3, for example. The work tendency information includes information such as a standard work period set for each work of each worker, a maximum number of workers for each work in each work area, and a work order indicating a temporal or positional order in which works are performed in a combination of works, for example. The work tendency information may include information indicating various tendencies in which various works are performed by the workers to be analyzed in the workplace 6. Furthermore, the work tendency information may include information indicating classifications such as the main work and the sub-work in the analysis chart 7. An operation of the work analysis device 5 using these various types of information will be described later.

1-2. Operation

Operations of the work analysis system 1 and the work analysis device 5 configured as described above will be described below.

The work analysis system 1 illustrated in FIG. 1 recognizes the positions of the workers W1 to W3 at each time in the workplace 6 by the image recognition processing, and estimates a work performed by each of the workers W1 to W3 at each time. The system 1 accumulates information indicating the estimation result, and generates the analysis chart 7 visualizing the work performed for each of the workers W1 to W3 in the analysis period based on the accumulated information.

The work analysis device 5 of the present embodiment performs image recognition on an image of the workplace 6 captured by the camera 2 by the image recognizer 51 and recognizes the positions of the workers W1 to W3, for example. For example, in the section Z1 illustrated in FIG. 3, the work analysis device 5 first determines the work performed by each worker according to in which area the position of each worker included in the recognition result by the image recognizer 51 is located among the work areas A1 and A2 or other areas.

In such determination, as in the work area A1 in which a plurality of works are expected as illustrated in the work area information D2 of FIG. 4A, even if the workers W1 to W3 can be specified by the image recognition processing based on the captured image from the camera 2, it may be difficult to discriminate works performed by the workers W1 to W3.

In the present embodiment, the work analysis system 1 provides the work analysis device 5 capable of estimating the work performed by each of the workers W1 to W3 based on the prestored work tendency information in addition to the image recognition processing, for example. According to the work analysis device 5 of the system 1, the analysis chart 7 is generated by determining the work performed based on the estimation result.

1-2-1. Problem

In the work analysis system 1 of the present embodiment, situations which may become a problem in discriminating works performed by each worker will be described with reference to FIGS. 5A to 5D and 6.

FIGS. 5A to 5D and 6 are diagrams for describing a problem related to the work analysis device 5, in which the workers W1 and W2 in the workplace 6 are viewed from above. FIGS. 5A to 5D and 6 each illustrates a state in which the workers W1 and W2 work in the section Z1 of the workplace 6.

FIG. 5A illustrates a state where the worker W1 performs a "movement" and the worker W2 performs "pickup". FIG. 513 illustrates a state where the worker W1 arrives at the work area A2 from the state of FIG. 5A, and the workers W1 and W2 each performs "pickup". FIG. 5C illustrates a state where the worker W1, who moves to the work area A1 after the state of FIG. 5B, performs "packing", and the worker W2 performs "pickup". FIG. 5D illustrates, a state where the worker W1 performs "box preparation" and the worker W2 performs "pickup" after the state of FIG. 5C.

In the example of FIG. 5A, since the worker W1 is located in an area between the work area A1 and the work area A2, the work performed by the worker W1 can be determined as movement. On the other hand, since the worker W2 is located in the work area A2 near the shelf 62, the work performed by the worker W2 can be determined as pickup. Furthermore, in the example of FIG. 5B, since the workers W1 and W2 are located in the work area A2, works performed by the workers W1 and W2 can be determined as pickup.

In the example of FIG. 5C, since the worker W1 is located in the work area A1 near the conveyor line 61 after in the work area A2 corresponding to pickup (FIG. 5B), the work performed can be determined as packing. In the example of FIG. 5D, since the worker W2 is located in the work area A2, the work performed can be determined as pickup.

However, in the state of FIG. 5D, even if it can be recognized that the worker W1 is located in the work area A1 similarity to the state of FIG. 5C, it is difficult to determine that the worker W1 is performing the work "box preparation" different from "packing" as the work performed in the state of FIG. 5C. That is, in the work area A1 in which the plurality of works are expected to be performed, it is difficult to determine whether the worker W1 is continuing packing or shifting to box preparation by the image recognition of the position of the worker W1 in the state of FIG. 5D, in which time passed from the state of FIG. 5C.

Figure 6:
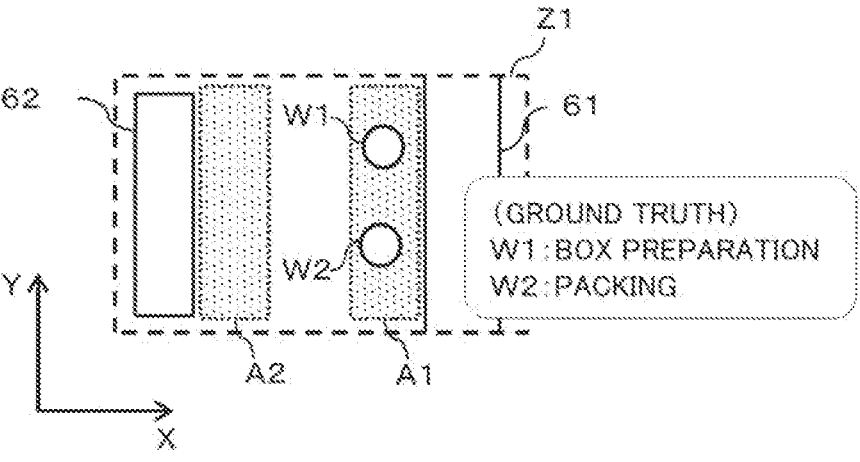
FIG. 6 is a diagram for describing a problem related to the work analysis device.

Furthermore. FIG. 6 illustrates a scene where the worker W1 performs "box preparation" and the worker W2 performs "packing". In the example of FIG. 6, the workers W1 and W2 are located in the work area A1. As described above, even in a scene where the workers W1 and W2 are working side by side in the work area A1 where the plurality of works are expected, it is difficult to determine whether each performed work is packing or box preparation.

As described above, a possible problem is that it may be difficult to discriminate the works performed by the workers W1 and W2 changing from moment to moment in the workplace 6 based only on the image recognition results of the workers W1 and W2.

Therefore, in the work analysis device 5 of the present embodiment, probabilistic arithmetic processing for estimating the work performed by each worker is executed based on the work tendency information such as the assignment information D3 in addition to the positions of the workers W1, W2 and the like. Accordingly, as illustrated in FIGS. 5D and 6, even in a situation where the plurality of works are performed in a specific area such as the work area A1 and therefore it is difficult to discriminate the works only by the positions of the workers W1 and W2, the works performed by the workers W1 and W2 can be discriminated by the estimation result.

For example, in the situation of FIG. 5D, it is possible to estimate that the work of the worker W1 shifted from packing to box preparation by using the information regarding time passed from the state of FIG. 5C. Furthermore, in the situation of FIG. 6, it is possible to estimate that the works performed by the workers W1 and W2 are box preparation and packing, respectively, based on the sections assigned to the workers W1 and W2 or based on a relationship between working positions, such as an upstream process and a downstream process in a combination of the plurality of works, for example.

1-2-2. Overall Operation

The overall operation of the work analysis device 5 in the work analysis system 1 will be described with reference to FIG. 7.

Figure 7:
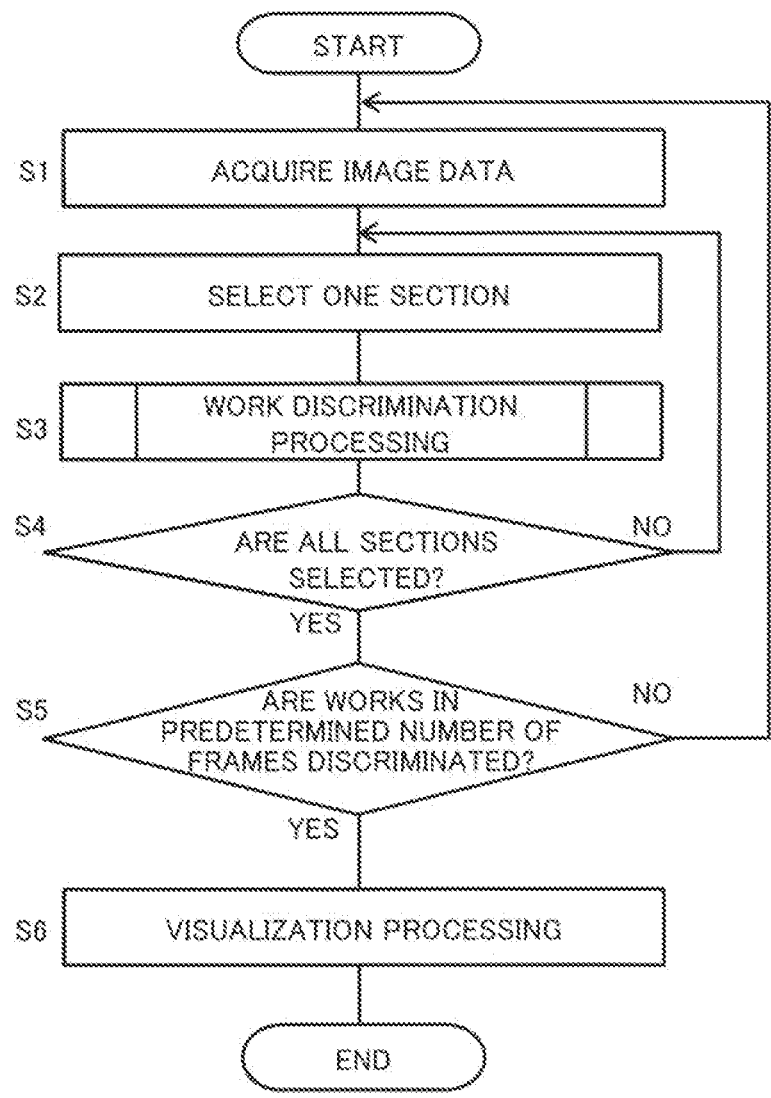
FIG. 7 is a flowchart for describing an overall operation of the work analysis device.

FIG. 7 is a flowchart for describing the overall operation of the work analysis device 5. The processing illustrated in this flowchart is executed by the controller 50 of the work analysis device 5, for example.

First, the controller 50 acquires image data from the camera 2 via the device I/F 54, for example (S1). For example, during work of the workers W1 to W3 in the workplace 6, the camera 2 captures a moving image to generate image data indicating a captured image at each time at a predetermined cycle such as a frame cycle of the moving image, and transmits the image data to the work analysis device 5.

Next, the controller 50 selects one section in the workplace 6 referring to the map data D1 (S2). For example, the section Z1 is first selected from the sections Z1 and Z2 illustrated in FIG. 3.

The controller 50 discriminates the works performed for each worker appearing in an area corresponding to the section selected in step S2 in the image indicated by the acquired image data (S3). In such work discrimination processing (S3), the controller 50 performs arithmetic processing for probabilistically estimating the work performed in a situation where the plurality of works are performed by the plurality of workers. In the present embodiment, the controller 50 performs the arithmetic processing of step S3 using the work tendency information such as the assignment information D3 described above in addition to the positions of the workers based on the image. Details of the work discrimination processing (S3) will be described later.

The controller 50 determines whether or not all the sections in the workplace 6 are selected referring to the map data D1 (S4), and repeats steps S2 to S3 until all the sections are selected per frame (NO in S4). For example, in the map data D1 of FIG. 3, the section Z2 is selected after the section Z1 is selected.

When all the sections are selected (YES in S4), the controller 50 determines whether or not works for a predetermined number of frames are discriminated (S5). The predetermined number of frames is the number of frames captured by the camera 2 in the analysis period to be visualized in the analysis chart 7, for example. The controller 50 repeats steps S1 to S4 until the works for the predetermined number of frames are discriminated (NO in S5).

When the works for the predetermined number of frames are discriminated (YES in S5), the controller 50 performs visualization processing to generate the analysis chart 7 (S6). For example, for each worker in the workplace 6, the controller 50 counts the number of works discriminated by the work discrimination processing (S3) for each time interval such as a period of one frame. When the total number of times of each work in the analysis period is calculated for each worker in this manner, the controller 50 calculates a ratio of each work for each worker to generate the analysis chart 7. In the analysis chart 7, the ratio of each work is indicated as the ratio of the time for each work to the analysis period, for example.

For example, the controller 50 stores the analysis chart 7 generated by the visualization processing (S6) in the storage 52, and ends the processing illustrated in this flowchart.

According to the above processing, the work discrimination processing (S3) estimates the work performed for each worker in each section of the workplace 6 (S3), and the analysis chart 7 is generated by discriminating the works performed based on the estimation results in the analysis periods of all the sections (S6). According to the work discrimination processing (S3) of the present embodiment, for example, even if it is difficult to discriminate the works performed in a specific time interval in the analysis period, the specific time period corresponding to a state as illustrated in each of FIGS. 5D and 6, the analysis chart 7 reflecting the works performed in all time intervals in the analysis period can be obtained.

In step S1 described above, recorded moving image data in the analysis period may be acquired from the camera 2. For example, after step S1, the controller 50 may select image data of each frame to perform the processing in and after step S2, and repeat these processing until all frames are selected instead of step S5.

1-2-3. Work Discrimination Processing (S3)

Details of the work discrimination processing in step S3 of FIG. 7 will be described with reference to FIGS. 8 and 9A to 9C.

Figure 8:
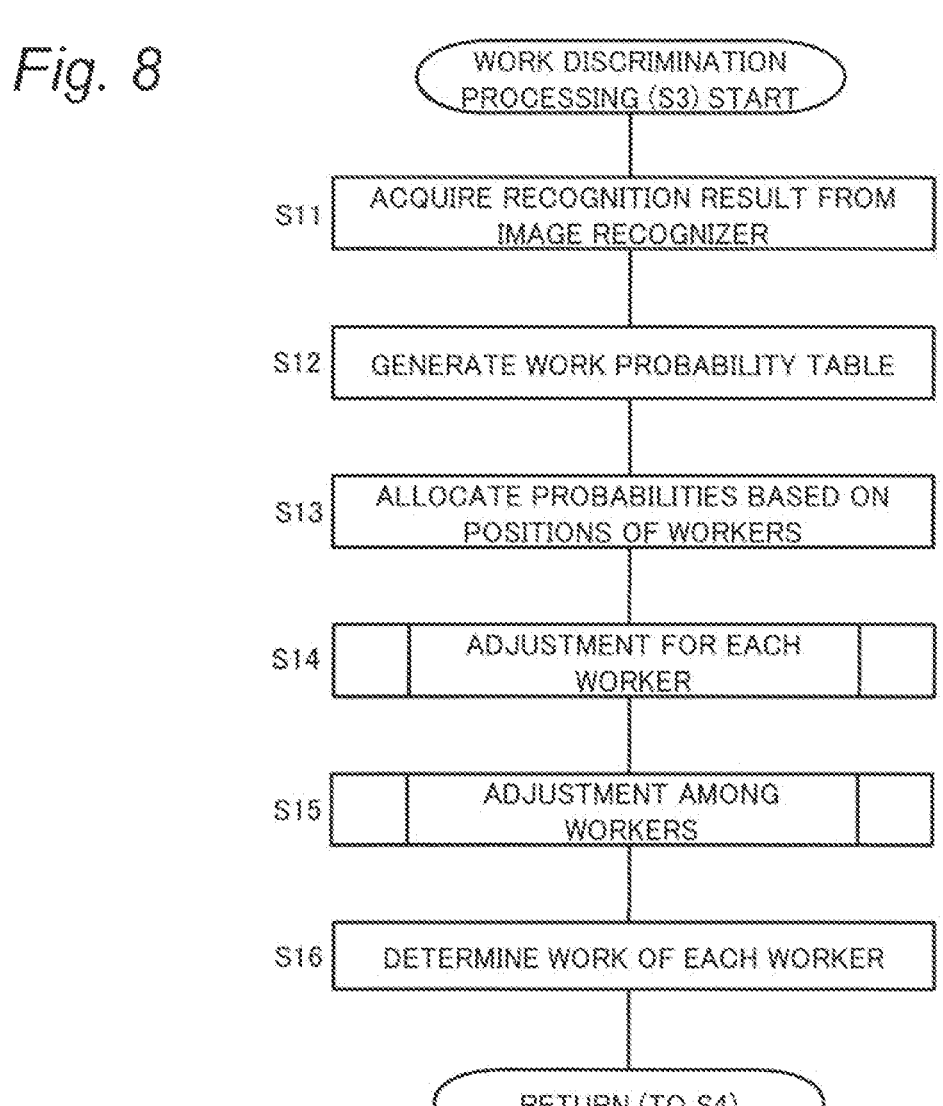
FIG. 8 is a flowchart illustrating work discrimination processing.

FIG. 8 is a flowchart illustrating work discrimination processing (S3 in FIG. 7) in the work analysis device 5 of the present embodiment. The processing illustrated in the flowchart of FIG. 8 is started in a state where one section is selected in step S2 of FIG. 7, for example. Hereinafter, a description will be given using an example in which the section Z1 in the workplace 6, as illustrated in the map data D1 in FIG. 3, is selected.

FIGS. 9A to 9C are diagrams for describing the work discrimination processing (S3). In the work discrimination processing (S3), the work analysis device 5 of the present embodiment generates a work probability table T1 for storing a probability for each worker performing each work. FIG. 9A illustrates the work probability table T1 in which items are set, according to the captured image of the scene illustrated in FIG. 6. FIGS. 913 and 9C illustrate the work probability table T1 in which the values are changed by the processing illustrated in the flowchart of FIG. 8. The work probability table T1 is an example of probability information in the present embodiment.

The work analysis device 5 of the present embodiment holds, in the work probability table T1, a probability for each work of each worker that can be calculated by determining the work area based on the recognition result of the position of each worker and the work area information D2. The work analysis device 5 of the present embodiment further performs arithmetic processing to adjust the probability in the work probability table T1 based on the work tendency information such as the assignment information D3 to realize estimation of the work performed.

In the flowchart of FIG. 8, first, the controller 50 functioning as the image recognizer 51 recognizes the positions of the workers W1, W2 and the like in the image indicated by the image data acquired in step S1 of FIG. 7, and acquires a recognition result (S11). At this time, the controller 50 calculates coordinate transformation for transforming a position recognized in an image into a coordinate system indicating a position in the workplace 6 based on the map data D1, for example.

Next, the controller 50 generates the work probability table T1 according to the section selected in step S2 of FIG. 7 (S12). The controller 50 sets the items of the works and the workers in the selected section in the work probability table T1, referring to the map data D1 and the work area information D2 stored in the storage 52 and the acquired recognition result, for example. Furthermore, the controller 50 sets a value of the maximum number of workers for each work, the value being stored in the storage 52 in advance, for example.

In the work probability table T1 of FIG. 9A, "packing", "box preparation", and "pickup" are set as the works in the section Z1 based on the work area information D2 of FIG. 4A, and "movement" is set as the work common to all the sections, for example. Furthermore, in the state of FIG. 6, "worker W1" and "worker W2" are set based on the recognition result in an area in the image corresponding to the section Z1, for example. In the example of FIG. 9A, the maximum number of workers for each of packing and box preparation is set to "1". For example, the maximum number of workers for each work is determined in advance according to space constraints in the work area or work properties of each work, and is stored in the storage 52. The packing and the box preparation each is an example of the second work in the present embodiment.

Next, the controller 50 allocates probabilities in the work probability table T1 based on the positions of the workers recognized in step S11 (S13). For example, the controller 50 compares the coordinates indicating the positions of the workers with the coordinates of the work area in the map data D1 to determine the work area including the position of each worker. The controller 50 allocates the probabilities to the works in the determined work area for each worker based on the work area information D2, for example.

FIG. 9B illustrates the work probability table T1 to which probabilities are allocated in step S13 based on the recognition result in the image of the scene illustrated in FIG. 6. In the example of FIG. 6, the positions of the workers W1 and W2 are recognized in the work area A1. Furthermore, as illustrated in the work area information D2 of FIG. 4A, two works of packing and box preparation associated with the work area A1. Therefore, in the work probability table T1 of FIG. 9B, a probability of "50%" is allocated to each of the packing and the box preparation for the worker W1, regarding the both works as performed in equal probabilities. Similarly to the worker W1, the probability is allocated to the worker W2.

Next, the controller 50 performs adjustment for each worker in the work probability table T1 in which the probabilities are allocated based on the positions of the workers (S14). The processing of step S14 is performed based on a previous discrimination result of the works performed, and information of a standard work period of each work and a temporal work order for each worker, for example. In the example of FIG. 5D, when determining that the standard work period of packing for the worker W1 passed based on the previous discrimination result, the controller 50 performs adjustment to reduce the probability of packing for the worker W1 by a predetermined value in the work probability table T1, for example. The predetermined value is set as a positive value in a range smaller than a probability divided equally by the number of workers, for example. Details of the processing for adjustment (S14) for each worker will be described later.

Next, the controller 50 performs adjustment among workers in the work probability table T1 according to a relationship among the plurality of workers (S15). The processing of step S15 is performed based on, for example, the work area information D2, the assignment information D3, the positional work order, and the information on the time of capturing the image in which respective workers are recognized by the image recognizes 51. In the example of FIG. 6, the controller 50 determines that a section assigned to the worker W2 is the section Z1 based on the assignment information D3 of FIG. 4B, and performs adjustment such as increasing the probability of packing, which is the main work in the works of the worker W2, by a predetermined value in the work probability table T1, for example. The predetermined value is set similarly to that in step S14, for example. FIG. 9C illustrates an example in which adjustment among workers is performed (S15) in the work probability table T1 before adjusted shown in FIG. 9B.

Next, the controller 50 determines the work performed by each worker based on the adjusted work probability table T1 (S16). In step S16, the controller 50 determines, as the work performed for each worker, a work with the highest probability among the plurality of works in the work probability table T1. In a case where the highest probability of a worker does not exceed a predetermined threshold, the controller 50 determines that the work performed by the worker is a predetermined work (e.g., idling). The controller 50 stores the discrimination result in the storage 52, for example. The predetermined threshold is set to a sufficiently large value from the viewpoint of excluding a work that is unlikely performed by each worker, for example.

For example, in step S16, in the work probability table T1 of FIG. 9C, it is determined that the works performed by the workers W1 and W2 are box preparation and packing, respectively.

After determining the work performed by each worker (S16), the controller 50 stores, the corrected work probability table T1 in the storage 52, and ends the processing illustrated in this flowchart, for example. Thereafter, the processing proceeds to step S4 in FIG. 7.

According to the above work discrimination processing (S3), even if the work performed by each worker cannot be determined from the probability allocated based on the positions of the workers (S13), the work probability table T1 adjusted based on the work tendency information can be obtained (S14, S15). By determining the work performed based on the work probability table T1 adjusted by the arithmetic processing for estimating the work to be performed for each worker (S16), it can be ensured that one work is allocated to each worker.

1-2-4. Processing for Adjustment for Each Worker

The processing of step S14 in the above-described work discrimination processing (FIG. 8) will be described with reference to FIG. 10.

Figure 10:
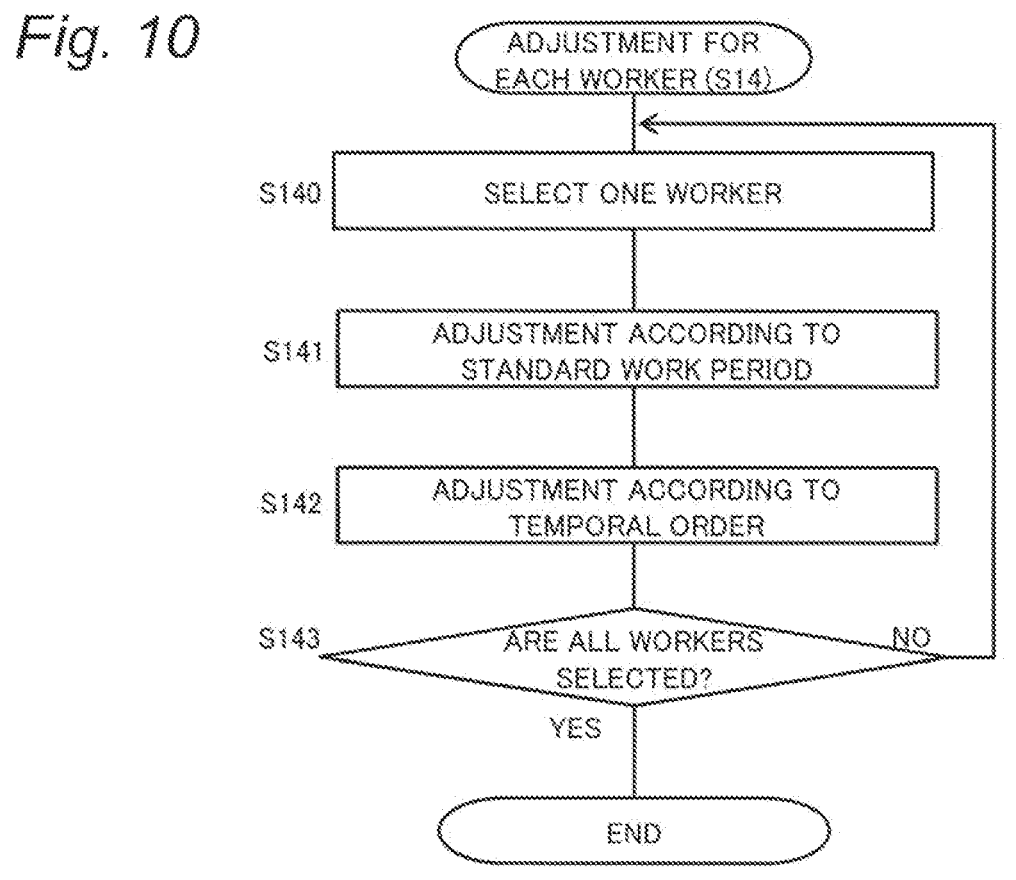

FIG. 10 is a flowchart illustrating processing for adjustment for each worker (S14 in FIG. 8) in the work analysis device 5 of the present embodiment. The processing illustrated in the flowchart of FIG. 10 is started in a state where probabilities are allocated based on positions of the workers in the work probability table T1, for example.

First, the controller 50 selects one worker in the work probability table T1 (S140). For example, in the work probability table T1 set according to the state of FIG. 5D, the worker W1 is selected from the workers W1 and W2.

The controller 50 performs adjustment according to the standard work period for the selected worker, referring to the information on the standard work period and the previous discrimination results of the work performed, which are stored in the storage 52 (S141), for example. The controller 50 determines whether or not a work in the work probability table T1 continues beyond the standard work period. In a case where such work is found, the controller 50 reduces the probability of the work in the work probability table T1. The standard work period is set for each worker based on a period required for each work measured in advance, for example.

In the example of FIG. 5D, since the worker W1 is located in the work area A1, a probability of "50%" is allocated to each of packing and box preparation for the worker W1 in the work probability table T1 (S13 of FIG. 8), similarly to FIG. 9A. For example, when the work of the worker W1 is discriminated as packing in the work discrimination processing related to the state of FIG. 5C, and the standard work period of packing for the worker W1 passed from the time of FIG. 5C at the time of FIG. 5D, the probability of packing for the worker W1 is reduced (S141). The packing is an example of the first work in the present embodiment.

Thereafter, the controller 50 normalizes probabilities of the plurality of works for the selected worker W1 in the work probability table T1, for example. In the example of FIG. 5D described above, in the two works of packing and box preparation, the probability of box preparation for the worker W1 is increased in association with a reduction amount of the probability of packing, for example. Furthermore, when adjusting the probability of the work for which the maximum number of workers is set, normalization may be performed by increasing the probability of the work for workers other than the selected worker, for example.

Moreover, the controller 50 performs adjustment according to the temporal order referring to information indicating the temporal work order stored in the storage 52, (S142) for example. The controller 50 reduces the probability of work that does not follow the work determined in the last work discrimination processing (FIG. 8) for the worker selected in step S140.

For example, in the state of FIG. 5C, similarly to the example of FIG. 5D, "50%" is allocated to each of the probabilities of packing and box preparation for the worker W1 in the work probability table T1 (S13 in FIG. 8). For example, in a case where the last work of the worker W1 selected in step S140 is pickup, adjustment to increase the probability of packing for the worker W1 is performed based on information on a temporal work order (S142). The temporal work order is set based on knowledge such that a worker picking up a product in the work of "pickup" then performs "packing". Thereafter, as in step S141, probabilities of the plurality of works are normalized for the selected worker W1 for example.

The controller 50 repeats the processing of steps S140 to S142 until all the workers in the work probability table T1 are selected (NO in S143). When all the workers are selected (YES in S143), the controller 50 ends the processing for adjustment for each worker (S14 in FIG. 8).

According to the above processing, the probability for each worker in the work probability table T1 is adjusted based on the information on the standard work period and the temporal work order for each worker (S141 and S142). Accordingly, even in a case where the worker W1 stays in the work area A1 where the plurality of works are performed as illustrated in FIG. 5D, the work of the worker W1 can be determined (S16 in FIG. 8) by the processing for adjustment based on the information on the standard work period (S141), for example.

The processing for adjustment based on the temporal work order (S142) is not limited to step S14 in FIG. 8, and may be executed when the probability is allocated in the work probability table T1 (S13 in FIG. 8), for example. Furthermore, the standard work period in step S141 may be calculated, for each work of each worker, by measuring a period from start to finish multiple times. After the multiple measurements, the standard work period may be calculated as a period in which the number of times of a predetermined ratio (e.g., 95% of the total number of times of measurement) is included in a frequency distribution of the measured periods, for example.

1-2-5. Processing for Adjustment Among Workers

The processing in step S14 in FIG. 8 will be described with reference to FIG. 11.

Figure 11:
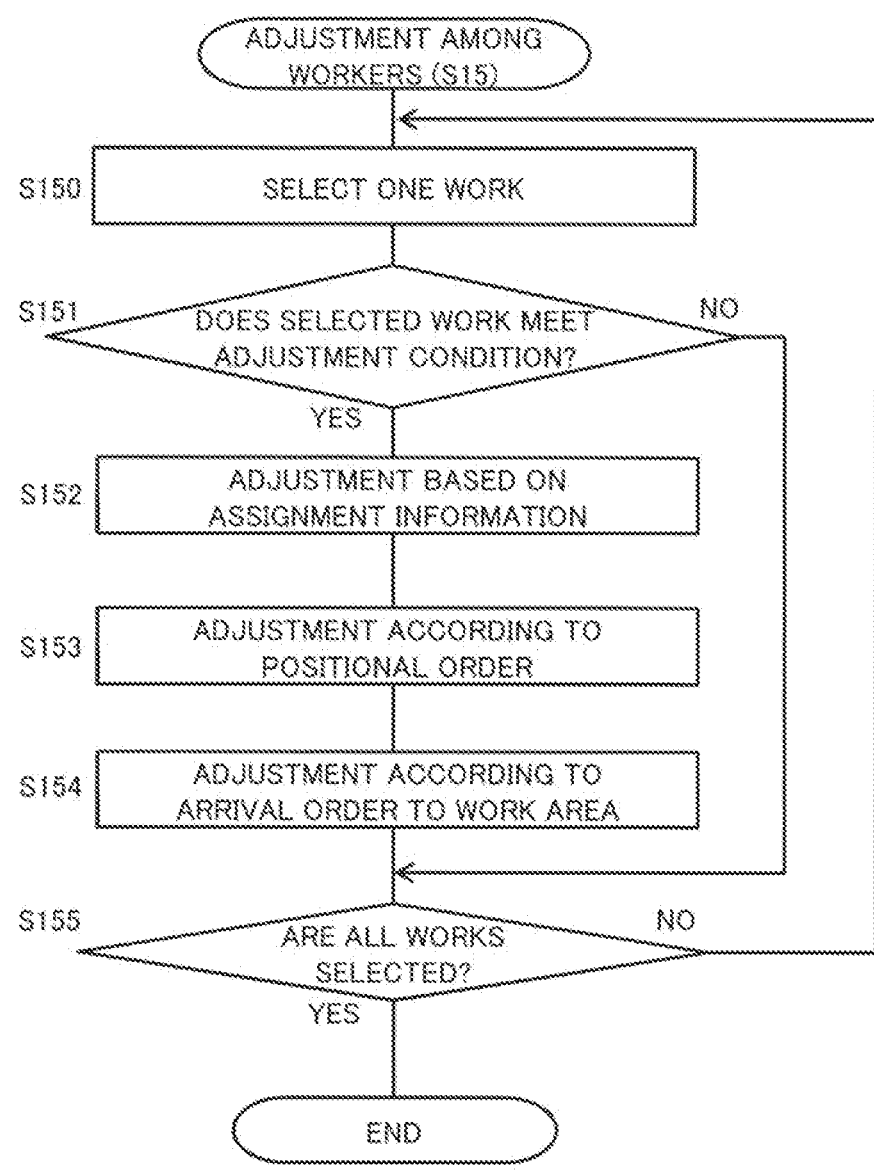
FIG. 11 is a flowchart illustrating processing for adjustment among workers.

FIG. 11 is a flowchart illustrating processing for adjustment among workers (S15 in FIG. 8) in the work analysis device 5 of the present embodiment. The processing illustrated in the flowchart of FIG. 11 is started in a state where the adjustment for each worker is performed in the work probability table T1 (S14 of FIG. 8), for example.

First, the controller 50 selects one work from the plurality of works in the work probability table T1 (S150). For example, in the work probability table T1 of FIG. 9B, packing is selected first.

Next, the controller 50 determines whether or not the selected work meets a predetermined adjustment condition (S151). The predetermined adjustment condition is set to adjust the probability based on a relationship among the plurality of workers for a specific work, for example. For example, the adjustment condition is that, when counting the number of workers with the highest probability for the selected work among all the works in the work probability table T1, the number of workers with the highest probability exceeds the maximum number of workers for the work. In a case where the selected work does not meets the adjustment condition (NO in S151), the controller 50 proceeds to step S155.

In a case where the selected work meets to the adjustment condition (YES in S151), the controller 50 performs adjustment to the work based on the assignment information D3 (S152). For example, in the work probability table T1 of FIG. 9B, the number of workers whose packing has the highest probability is two (i.e., the workers W1 and W2), which exceeds the maximum number of "1", and thus adjustment is performed for packing.

In step S152, the controller 50 increases, referring to the assignment information D3, the probability of the main work for the worker assigned to the section selected in step S2 in FIG. 7, that is, the section of a target for the work discrimination processing (S3). In the present embodiment, in accordance with the classification of the works in the analysis chart 7 of FIG. 1, the main work is packing, for example. For example, in the work probability table T1 of FIG. 9B, since a section assigned to the worker W2 is the section Z1 in the assignment information D3 of FIG. 4B, adjustment is performed to increase the probability of packing which is the main work of the worker W2.

Thereafter, the controller 50 performs processing to normalize the probabilities in each of the worker and work to which adjustment is performed, that is, in each of the row and the column of the work probability table T1, for example. In the example of FIG. 9B, after the probability of packing for the worker W2 is increased by adjustment, normalization reducing the probability of the box preparation for the worker W2 and the probability of packing for the worker W1 is performed. Moreover, the controller 50 increases the probability of box preparation for the worker W1 by normalization for the worker W1, for example.

In the adjustment based on the assignment information D3 in step S152, an assigned work may be set in advance for each worker, and the probability of the assigned work may be increased instead of the main work of the above-described example, for example. In this case, the assignment information D3 may include information indicating the assigned work. Furthermore, the main work may be set in advance for each section or work area, and information indicating the main work may be included in the work area information D2, for example. In this case, the work area information D2 is referred to in step S152.

Next, the controller 50 performs adjustment according to a positional order based on a relation of working positions in combinations of the plurality of works including the selected work (S153). The controller 50 performs the processing of step S153 by referring to information indicating a positional work order stored in the storage 52 and the recognition result acquired in step S11 of FIG. 8, for example.

For example, in the state of FIG. 6 associated with the work probability table T1 of FIGS. 9A to 9C, in the work area A1 where two works of packing and box preparation are performed, the position of the worker W1 is recognized in +Y direction than the worker W2, that is, on an upstream side of the conveyor line 61 (S11 of FIG. 8). In this case, the controller 50 performs adjustment to reduce, for the work "packing" as an adjustment target, the probability for the worker W1, who is regarded as not performing the work, based on the information on the positional work order such that box preparation performed on the upstream side of the conveyor line 61 and packing performed on the downstream side (S153), for example. Thereafter, with respect to the each of packing and worker W1 to which adjustment is performed, the probability is normalized as in step S152, for example.

Next, the controller 50 performs adjustment by an order of arrival at the work area corresponding to the selected work (S154). For example, based on the work area information D2 and a past recognition result by the image recognizer 51, the controller 50 compares times of capturing images at which respective workers are recognized in the work area corresponding to the selected work. For example, the controller 50 increases the probability of the work for the worker first recognized in the work area. The worker can be regarded as having the earliest arrival time at the work area and the earliest start time of the selected work, among the workers having working times not more than the standard work period of the selected work. Thereafter similarly to step S152, the controller 50 performs normalization regarding each of the work and worker to which adjustment is performed, for example.

The controller 50 repeats the processing of step S150 and subsequent steps until all works in the work probability table T1 are selected (NO in S155). When ail works are selected (YES in S155), the controller 50 ends the processing for adjustment among workers (S15).

According to the above processing, the probability for each work in the work probability table T1 is adjusted based on the assignment information D3, the positional work order information, and the order of arrival at the work area (S152 to S154). For example, in the state of FIG. 6 in which the plurality of workers W1 and W2 work in the work area A1 associated with the plurality of works, the work probability table T1 adjusted as illustrated in FIG. 9C is obtained from the probability before adjustment as in FIG. 9B. Accordingly, even when it is difficult to determine the work based on the probabilities allocated from the positions of the workers W1 and W2, it is possible to determine the work performed for each worker based on the adjusted work probability table T1 (S16 in FIG. 8).

In the above processing, the adjustments in steps S152 to S154 may be performed in an order different from the above-described example, or only some of the adjustment in steps S152 to S154 may be performed. Furthermore, as the predetermined value for increasing or decreasing the probability by adjustment in the work probability table T1, a random number generated as a positive number in a range smaller than the probability equally divided according to the number of workers may be used, for example.

1-3. Effects

As described above, the work analysis device 5 according to the present embodiment generates information on the plurality of works performed by the workers W1 to W3 as an example of one or more workers in the workplace 6 as an example of the workplace. The work analysis device 5 includes the storage 52, the device I/F 54 as an example of the acquisition circuitry, and the controller 50. The storage 52 stores the map data D1 and the work area information D2 each as an example of the map information indicating the work areas A1 and A2, each of which is example of an area associated with each work in the workplace 6. For example, the device I/F 54 acquires image data indicating a captured image from the camera 2 as an example of the position information including positions of the workers at each time in the workplace 6 (S1). The controller 50 performs arithmetic processing to discriminate the works of the workers at each time based on the position information and the map information (S3). Based on the position information, the controller 50 generates the work probability table T1 which is an example of probability information indicating a probability that a work is performed by the workers, the work being associated with an area including positions of the workers at each time in the map information (S12, S13). The controller 50 adjusts the work probability table T1 in accordance with the assignment information D3 and the like which are examples of the work tendency information indicating a tendency for the workers to perform the works in the workplace 6 (S14, S15).

According to the work analysis device 5 described above, the work probability table T1 generated based on the position information is adjusted according to the work tendency information such as the assignment information D3. Thus, when the plurality of works are performed by one or more workers, the work performed by the respective workers can be estimated. In the work analysis device 5, the controller 50 may function as an acquisition circuitry to acquire the recognition result by the image recognizer 51 as an example of the position information.

In the present embodiment, when positions of the workers are included in a specific area such as the work area A1 with which two or more works are associated in the map information, the controller 50 adjusts the work probability table T1 to differentiate probabilities related to the two or more works from each other according to the work tendency information (S14, S15). Thus, even if equal probabilities are allocated to the two or more works based on the position information in the work probability table T1, the work performed by the respective workers can be determined based on the adjusted work probability table T1 obtained as the estimation result (See FIGS. 9B and 9C).

In the present embodiment, when positions of a plurality of the workers are included in the specific area such as the work area A1 with which the two or more works are associated in the map information, the controller 50 adjusts a probability related to a work of each worker among the plurality of workers according to the work tendency information (S15). Thus, even in a case where the work performed by each worker cannot be determined based on the work area including the positions of the plurality of workers, such as the state of FIG. 6, it is possible to estimate the work performed by the adjustment among workers.

In the present embodiment, the work tendency information includes information indicating a standard work period set to a first work in the plurality of works. When a period for the first work exceeds the standard work period, the controller 50 reduces a probability related to the first work, the period for the first work being a period in which positions of the workers are included in an area associated with the first work (S141). Thus, as illustrated in FIGS. 5C and 5D, even when the positions of the worker W1 are continuously included in the work area A1, which is an example of the area associated with packing (an example of the first work), the work performed by the worker W1 can be estimated based on the standard work period of packing, for example.

In the present embodiment, the work tendency information includes information indicating the maximum number of workers who perform a second work in the plurality of works in parallel. When the number of workers at positions included in the area associated with the second work exceeds the maximum number (YES in S151), the controller 50 changes a probability related to the second work for each worker (S152 to S154). Thus, it is possible to perform the adjustment among workers to satisfy the maximum number of workers for each work such as packing and box preparation (each as an example of the second work) in the work probability table T1 of FIGS. 9A to 9C, for example.

In the present embodiment, the work tendency information includes the assignment information D3 (an example of the assignment information) in which the section Z1 or the like, which is an example of the area related to the second work, is associated with the workers. When the positions of the workers are included in the area associated in the assignment information D3, the controller 50 adjusts a probability related to a work associated with the area (S152). Thus, it is possible to adjust the probability by reflecting the tendency in the workplace 6 in which each worker likely performs the work in the work area included in the assigned section associated with the worker in the assignment information D3. The assignment information D3 may be generated based on the frequency with which the worker stays in the section.

In the present embodiment, the recognition result by the image recognizer 51 (an example of the position information) includes information indicating time when a plurality of workers arrive at the work area which is an example of the area. When the number of workers at positions included in the work area associated with the second work exceeds the maximum number of workers (YES in S151), the controller 50 increases probabilities for workers arriving at the area earlier among the plurality of workers (S154). Thus, it is possible to perform adjustment to increase the probabilities of the workers who arrives at the work area early and can be regarded as workers with early start times of the work associated with the work area.

In the present embodiment, the work tendency information includes information indicating an order in a combination of two or more works in the plurality of works. The controller 50 adjusts a probability related to each work in the combination according to the order (S142, S153). Thus, as illustrated in FIGS. 5D and 6, even when the position of the worker is included in the work area A1 corresponding to the two or more works, the work performed by the worker can be estimated based on the order, for example. In the present embodiment, the information indicating the order includes information of a temporal or positional work order, for example. In the example of FIG. 5D, the work performed by the worker W1 is estimated from the temporal work order, and in the example of FIG. 6, the works performed by the workers W1 and W2 are estimated from the positional work order.

In the present embodiment, based on the work probability table T1 (an example of the probability information) for the analysis period (an example of a predetermined period), the controller 50 generates the analysis chart 7 which is an example of information indicating a ratio of the plurality of works over the predetermined period for each worker (S6). Thus, the estimation result of the work performed by each worker over the analysis period can be presented to the user 3 of the work analysis system 1, for example.

The work analysis method of the present embodiment is a method for generating information on a plurality of works performed by one or more workers in the workplace 6. The storage 52 of the work analysis device 5, which is an example of the computer, stores the map data D1 and the work area information D2 (each as an example of the map information) indicating an area associated with each work in the workplace 6. The method includes acquiring (S1, S11), by the controller 50 of the computer, position information including a position of a worker at each time in the workplace 6, generating (S12. S13), based on the position information, the work probability table T1 (an example of the probability information) indicating a probability that a work is performed by the workers, the work being associated with an area including the position of the worker at each time in the map information, and adjusting (S14, S15) the probability information according to the work tendency information such as the assignment information D3 indicating a tendency for the workers to perform the works in the workplace 6.

In the present embodiment, a program for causing a controller of a computer to execute the work analysis method as described above is provided. According to the work analysis method of the present embodiment, when the plurality of works are performed by one or more workers, it is possible to estimate the work performed by the respective workers.

Second Embodiment

Hereinafter, a second embodiment of the present disclosure will be described with reference to FIGS. 12 to 15. In the first embodiment, the work analysis system 1 generating the analysis chart 7 over the analysis period by the work analysis device 5 (S6 in FIG. 7) is described. In the present embodiment, a work analysis system 1A including an information presentation device capable of displaying an analysis result of work contents according to a user operation designating a specific time and one or more of workers W1 to W3 will be described.

Hereinafter, the description of substantially the same configuration and operation as those of the work analysis system 1 according to the first embodiment will be appropriately omitted, and the work analysis system 1A according to the present embodiment will be described.

2-1. System Overview

Figure 12:
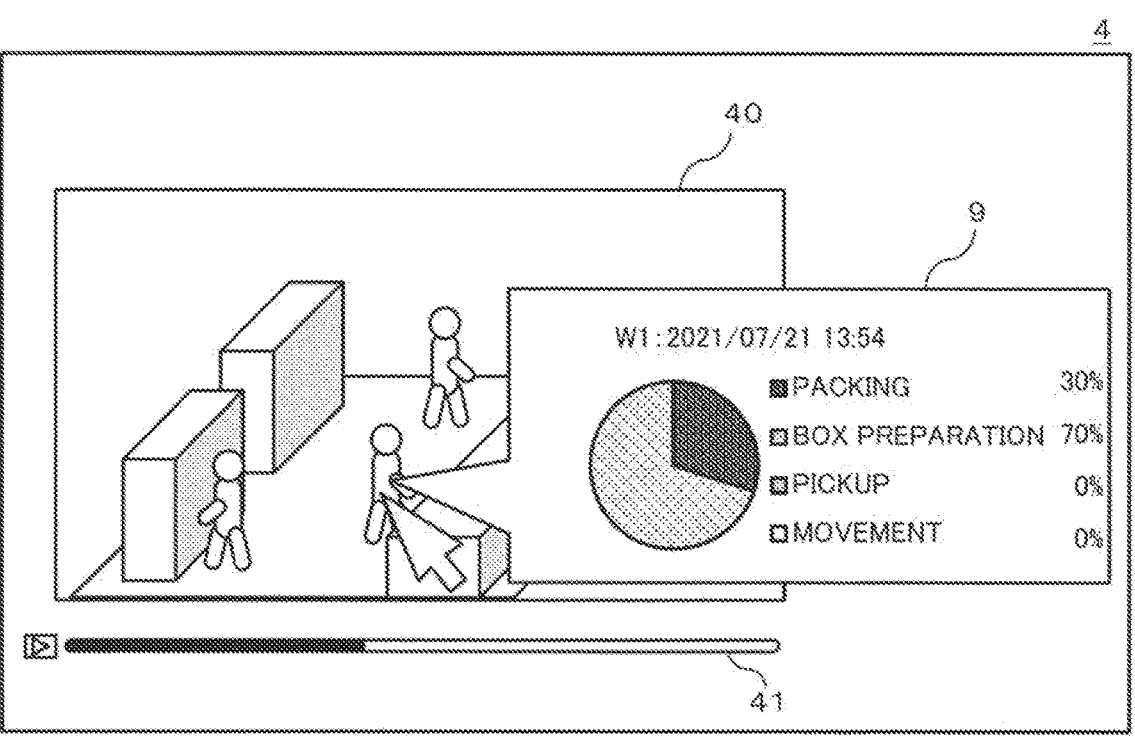
FIG. 12 is a diagram illustrating a display example in an information presentation device in a work analysis system according to a second embodiment.

FIG. 12 illustrates a display example in an information presentation device in the work analysis system 1A of the present embodiment. The information presentation device in the work analysis system 1A includes an information processing device such as a PC including a monitor 4, for example.

In the example of FIG. 12, the monitor 4 displays an image 40 indicating a moving image of a workplace 6 captured by a camera 2, a progress bar 41 indicating a playback status in a recording period of the moving image, and estimated work information 9 indicating an analysis result of work contents at a specific time.

In the system 1A, while a moving image of the workplace 6 is played back on the monitor 4, the estimated work information 9 can be displayed by the user operation designating a time in the moving image and one or more of workers W1 to W3, for example. In the example of FIG. 12, a playback time is designated on the progress bar 41, and the estimated work information 9 regarding the worker W1 at the designated time is displayed by a user operation selecting the worker W1 on the image 40, for example. The estimated work information 9 in FIG. 12 indicates that the work performed by the worker W1 at the time "13:54" is estimated to be packing with a probability of "30%", box preparation with a probability of "70%", and other works with a probability of "0%".

According to such estimated work information 9, the user of the system 1A can check the estimation result of the work performed by the designated ones of workers W1 to W3 at a specific time, and can analyze the work performed for each of the workers W1 to W3 in detail, for example.

2-2. Configuration of Information Presentation Device

Figure 13:
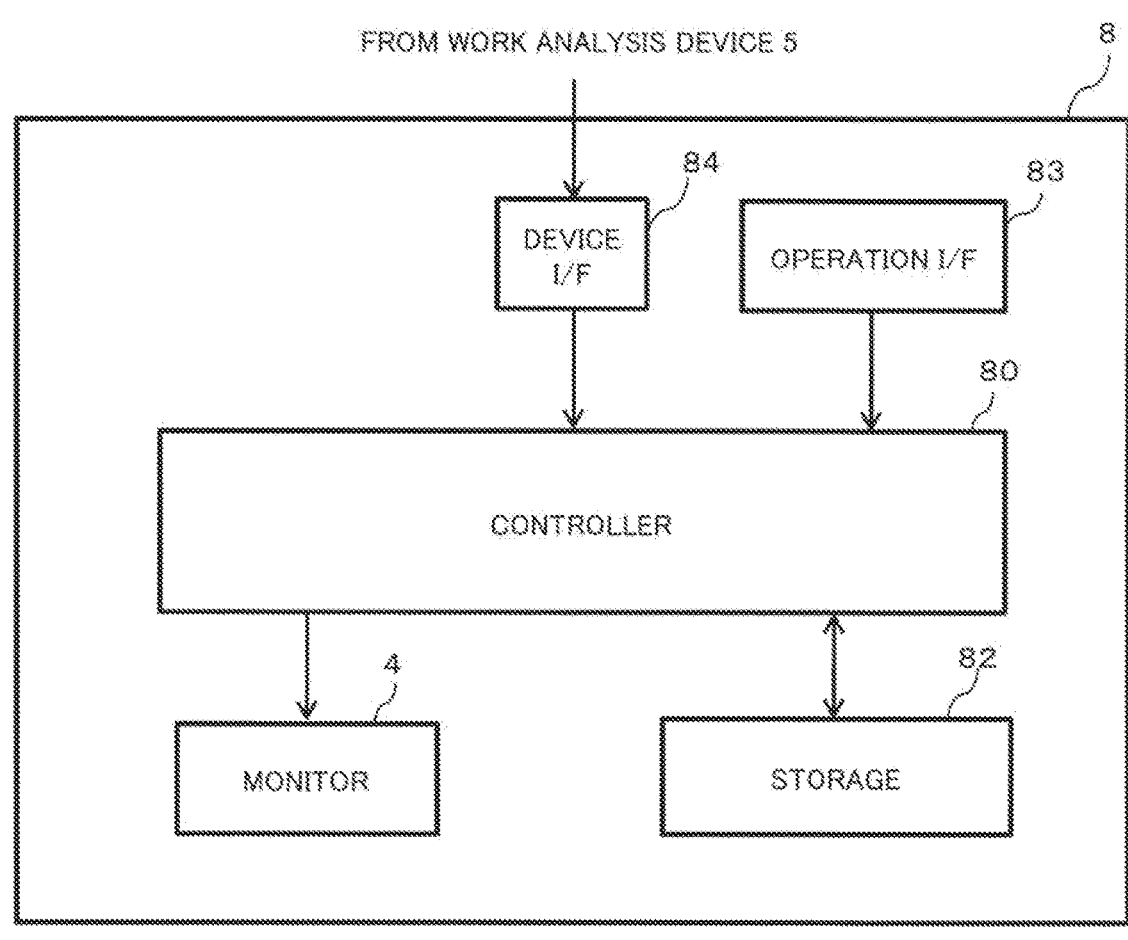
FIG. 13 is a block diagram illustrating a configuration of the information presentation device in the work analysis system according to the second embodiment.

A configuration of the information presentation device including the monitor 4 capable of displaying the estimated work information 9 as described above will be described with reference to FIG. 13. FIG. 13 is a block diagram illustrating a configuration of the information presentation device 8 in the work analysis system 1A of the present embodiment.

The information presentation device 8 illustrated in FIG. 13 includes a controller 80, a storage 82, an operation I/F 83, a device I/F 84, and the monitor 4.

The controller 80 includes a CPU or an MPU to realize a predetermined function in cooperation with software, and controls the overall operation of the information presentation device 8, for example. The controller 80 performs various arithmetic processing to realize various functions, reading data and programs stored in the storage 82. The above program may be provided via a communication network such as the Internet. or may be stored in a portable recording medium. The controller 80 may include an internal memory as a temporary storage area for holding various data and programs. For example, similarly to the controller 50 of the work analysis device 5, the controller 80 is not limited to a CPU and may be implemented with various circuits.

The storage 82 is a storage medium that stores programs and data necessary for implementing the functions of the information presentation device 8. The storage 82 includes an HDD or an SSD, for example. For example, the storage 82 stores the above-described program and various types of information such as image data from the camera 2 and a work probability table T1 acquired from the work analysis device 5 as described later. The storage 82 may include a temporary storage element such as a DRAM or an SRAM, and may function as a working area of the controller 80, for example.

The operation I/F 83 is a general term for operation members that receive a user's operation. The operation I/F 83 includes any of a keyboard, a mouse, a trackpad, a touchpad, a button, a switch, and the like, or a combination thereof, for example. The operation IT 83 acquires various types of information input by a user's operation.

The device I/F 84 is a circuit for connecting an external device such as the work analysis device 5 to the information presentation device 8. The device I/F 84 performs communication according to a predetermined communication standard similarly to the device I/F 54 of the work analysis device 5, for example. The device I/F 84 is an example of an acquisition circuitry that receives various pieces of information from the external device in the information presentation device 8. In the work analysis system 1A, the information presentation device 8 acquires the image data generated by the camera 2 and the adjusted work probability table T1 from the work analysis device 5 via the device I/F 84, for example.

The monitor 4 is an example of a display that displays various types of information. For example, the monitor 4 displays an image indicated by image data acquired from the work analysis device 5. Furthermore, the monitor 4 displays a menu screen or the like for the user of the work analysis system 1A to perform various settings, for example. The monitor 4 can be configured by a liquid crystal display device or an organic EL device, for example.

The configuration of the information presentation device 8 as described above is an example, and the configuration of the information presentation device 8 is not limited thereto. For example, the information presentation device 8 may have a configuration that communicates with an external information processing device via a communication network in addition to or instead of the above configuration. Furthermore, the acquisition circuitry in the information presentation device 8 may be realized by cooperation with various kinds of software executed by the controller 80 or the like, and may acquire various kinds of information by reading various kinds of information stored in various kinds of storage media (e.g., the storage 82) to a working area of the controller 80. Furthermore, the information presentation device 8 is not limited to the PC, and may be configured as a tablet computer, a smartphone, or the like.

2-3. Operation of Work Analysis Device

The overall operation of the work analysis device 5 in the work analysis system 1A including the information presentation device 8 as described above will be described with reference to FIG. 14.

Figure 14:
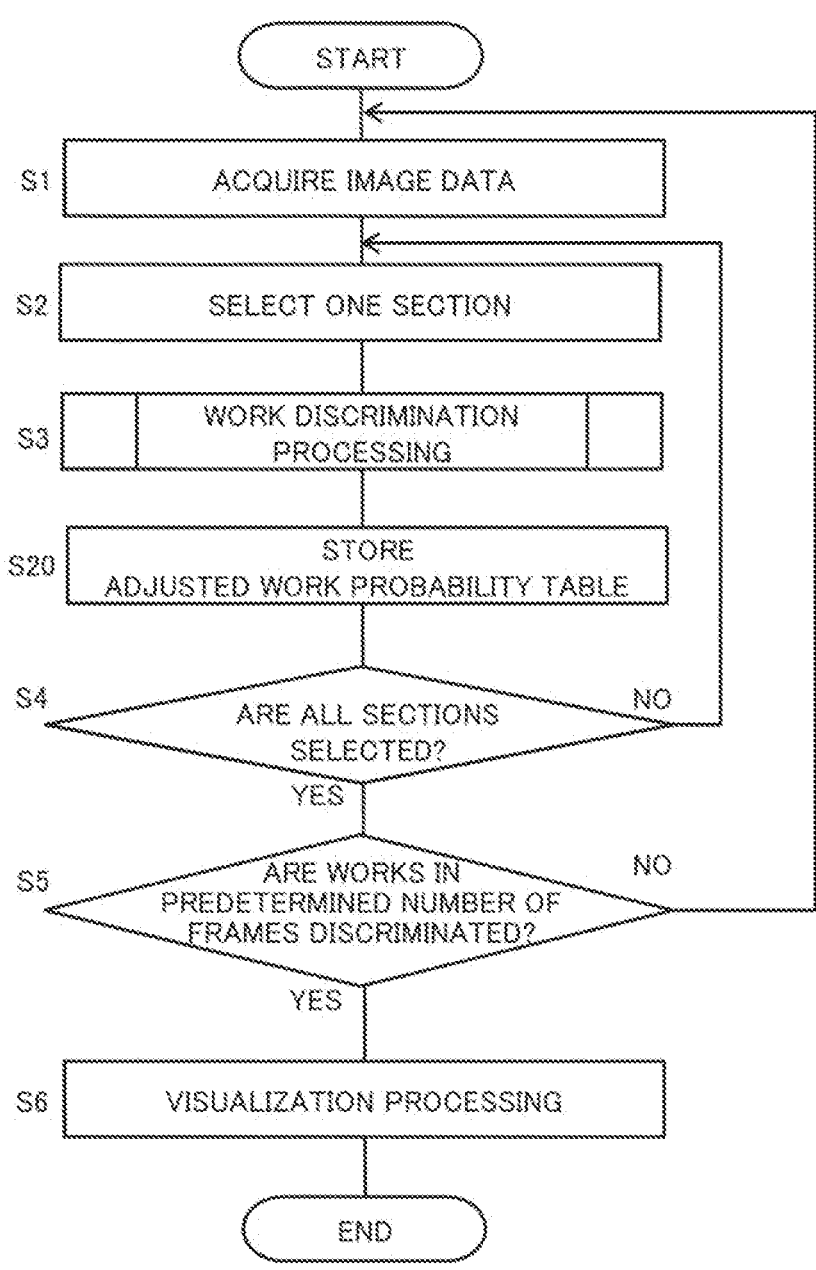
FIG. 14 is a flowchart for describing an overall operation of a work analysis device according to the second embodiment.

FIG. 14 is a flowchart for describing the overall operation of the work analysis device 5 according to the present embodiment. The controller 50 in the work analysis device 5 of the present embodiment stores the adjusted work probability table T1 (see FIG. 9C) in the storage 52 or the like (S20) after the work discrimination processing (S3), in addition to the processing of steps S1 to S6 similar to FIG. 7 of the first embodiment, for example.

According to the work analysis device 5 of the present embodiment, by repeating the above processing at a predetermined cycle and storing the work probability table T1 at each time, the estimation result of the performed work for each of the workers W1 to W3 at each time is accumulated, for example.

2-4. Operation of Information Presentation Device

As described above, in the work analysis system 1A, the information presentation device 8 displays the estimated work information 9 according to the designation by the user based on the work probability table T1 stored at each time. Such operation of the information presentation device 8 will be described with reference to FIG.

Figure 15:
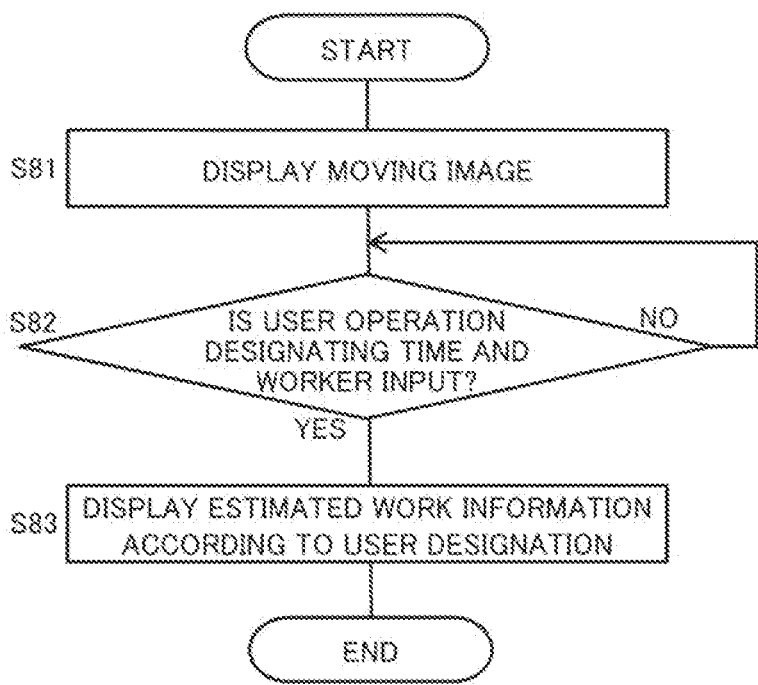
FIG. 15 is a flowchart illustrating an operation of the information presentation device.

FIG. 15 is a flowchart illustrating the operation of the information presentation device 8. This flowchart is started when a predetermined user operation for starting analysis in the information presentation device 8 is input after the processing of FIG. 14 is executed in the work analysis device 5 over the analysis period, for example. Each processing illustrated in this flowchart is executed by the controller 80 of the information presentation device 8, for example.

First, the controller 80 acquires image data indicating a moving image of the workplace 6 captured by the camera 2 from the work analysis device 5 via the device I/F 84, for example, and displays the moving image on the monitor 4 (S81). For example, the controller 50 of the work analysis device 5 transmits, via the device I/F 54, image data to which the work discrimination processing (S3 in FIG. 14) is applied. The information presentation device 8 plays back a moving image based on the received image data. In the example of FIG. 12, the monitor 4 displays an image 40 indicating a moving image being played back.

Next, the controller 80 determines whether or not a user operation designating the time and one or more of workers W1 to W3 is input on the operation I/F 83 for the moving image being displayed, for example (S82). For example, the controller 80 controls the operation I/F 83 and the monitor 4 to receive a user operation of designating a time on the progress bar 41 for the moving image exemplified in FIG. 12 and a user operation selecting one of the workers W1 to W3 on the image 40.

When the user operation designating the time and the worker is not input (NO in S82), the controller 80 repeats the determination in step S82 at a predetermined cycle, for example.

When the user operation is input (YES in S82), the controller 80 acquires the adjusted work probability table T1 at the designated time from the work analysis device 5 and displays the estimated work information 9 on the designated one of workers W1 to W3 on the monitor 4 (S83), for example. For example, the controller 80 causes the device I/F 54 to transmit information indicating the time designated by the user operation and the one of workers W1 to W3 to the work analysis device 5 and receive the adjusted work probability table T1 of the time in the information. For example, the controller 80 extracts, for the designated worker among the workers W1 to W3, the probability of each work performed from the acquired work probability table T1 and generates the estimated work information 9.

In the example of FIG. 12, a user operation designating the time "13:54" and the worker W1 is input (YES in S82), and the estimated work information 9 is displayed based on the probability of each work performed by the worker W1 at the time (S83).

After the estimated work information 9 according to the designation by the user operation is displayed (S83), the controller 80 ends the processing of this flowchart.

According to the above processing, when the user operation designating the time and one or more of workers W1 to W3 is input while the moving image is displayed (S81) (YES in S82), the information presentation device 8 can display the estimated work information 9 according to the designation by the user operation on the monitor 4 (S83).

In step S82 described above, an example of determining the presence or absence of a user operation designating both the time and one or more of workers W1 to W3 is described. In step S82, the present disclosure is not limited to the above example, and the presence or absence of a user operation designating either the time or any of workers W1 to W3 may be determined. In this case, when a user operation designating the time is input, the information presentation device 8 may display, in step S83, the estimated work information 9 on each of the workers W1 to W3 at the designated time, for example. Furthermore, when a user operation designating any of workers W1 to W3 is input, the information presentation device 8 may display, in step S83, the estimated work information 9 of the designated workers at the time of the moving image being displayed in step S81, for example.

In step S81 described above, an example in which the image data of the moving image over the analysis period is acquired from the work analysis device 5 and displayed is described. Step S81 is not limited to the above example, and image data of each frame may be displayed by sequentially acquiring image data in a frame cycle of a moving image, for example. In this case, in step S82, it may be determined whether or not a user operation designating a time before the time corresponding to the frame being displayed is input, and when the user operation is not input (NO in S82), the processing in and after step S81 may be repeated, for example. Furthermore, in step S81, the information presentation device 8 may acquire image data from the camera 2 via the device 84, for example.

In step S83 described above, an example is described in which the estimated work information 9 based on the work probability table T1 acquired from the work analysis device 5 is displayed on the monitor 4. In step S83, the monitor 4 may display not only the estimated work information 9 illustrated in FIG. 12, but also the acquired work probability table T1, for example. Furthermore, in step S83, a heat map according to the probability of each work performed in the work probability table T1 may be generated and displayed, for example.

2-5. Effects

As described above, the work analysis system 1A according to the present embodiment includes the work analysis device 5 and the information presentation device 8 that acquires the adjusted work probability table T1 (an example of the probability information) from the work analysis device 5 and displays the acquired probability information (S83). According to such a work analysis system 1A, the information presentation device 8 can present the estimation results of the works performed by the workers W1 to W3 to the user based on the acquired work probability table T1.

In the work analysis system 1A of the present embodiment, the information presentation device 8 includes the device I/F 84 (an example of the communication circuitry), the operation I/F 83, the controller 80, and the monitor 4 (an example of the display). The device I/F 84 performs data communication with the work analysis device 5. The operation I/F 83 receives a user operation inputting designation information indicating at least one of time in the workplace 6 and the workers W1 to W3 (S82). The controller 80 causes the device I/F 84 to transmit the designation information to the work analysis device 5 according to the user operation, and to receive the time designated by the user operation and/or the adjusted work probability table T1 regarding the workers W1 to W3 as an example of the probability information according to the designation information from the work analysis device 5 (S83). The monitor 4 displays the estimated work information 9 based on the adjusted work probability table T1 as an example of the probability information corresponding to the designation information (S83).

As described above, in the present embodiment, the information presentation device 8 acquires the adjusted work probability table T1 (an example of the probability information) from the work analysis device 5 and displays the acquired probability information (S83). According to the information presentation device 8, the probability information according to the user operation can be displayed to facilitate the analysis of the work performed.

Other Embodiments

The first and second embodiments are described above each as an example of the technique disclosed in the present application. However, the technique in the present disclosure is not limited thereto, and can also be applied to exemplary embodiments in which changes, substitutions, additions, omissions, and the like are made as appropriate. Furthermore, it is also possible to combine the components described in the above embodiments to form a new embodiment. Therefore, other embodiments will be exemplified below.

In each of the above embodiments, an example is described in which the analysis chart 7 is generated for each work based on the total number of times that the work is determined as the work performed by each worker at predetermined time intervals in the visualization processing (S6 in FIG. 7), but step S6 is not limited thereto. For example, the controller 50 may generate the analysis chart 7 by calculating a total value of probabilities of each work at time intervals over the analysis period based on the adjusted work probability tables T1 accumulated in the analysis period, and by calculating a ratio of each work for each worker based on the total value of the probabilities.

Furthermore, in each of the above embodiments, an example is described in which the image data of the captured image by the camera 2 is acquired via the device I/F; 54 in step S1 of FIG. 7, but processing in step S1 is not limited thereto. For example, the work analysis device 5 may read image data stored in advance in the storage 52. Furthermore, in step S1, the image data may be acquired in units of multiple frames, or one frame may be acquired for every multiple frames.

In the second embodiment described above, after the processing of FIG. 14 in the work analysis device 5 is executed over the analysis period, the processing of FIG. 15 for displaying the estimated work information 9 is executed in the information presentation device 8. In the present embodiment, for example, while the processing of FIG. 14 is being executed in a frame cycle of a moving image, the processing of FIG. 15 may be executed every time the adjusted work probability table T1 is stored (S20). In this case, in step S81 of FIG. 15, for example, image data of each frame may be acquired and displayed on the monitor 4. Accordingly, it is possible to display the estimated work information 9 according to the time and the designation of the workers W1 to W3 (S83) in real time.

Furthermore, in each of the above embodiments, an example is described in which the image data is acquired in step S1 of FIG. 7 and the position of the worker is recognized by the image recognition processing in step S11 of FIG. 8, but steps S1 and S11 are not limited thereto. For example, the work analysis device 5 may acquire position information of the worker obtained by a beacon or GPS via the device I/F 54.

Furthermore, in each of the above embodiments, the example is described in which the work analysis system 1 is applied to the workplace 6 such as a distribution warehouse. In the present embodiment, the workplace to which the work analysis system 1 and the work analysis device 5 are applied, that is, a field site, is not limited to the above-described workplace 6, and may be various sites such as a factory or a store floor. Furthermore, the work determined by the work analysis system 1 is not limited to the example of packing or the like described above, and may be various Works according to the various sites. Furthermore, the workers to be analyzed by the work analysis system 1 are not limited to persons such as the workers W1 to W3, and may be a moving object capable of performing various works. For example, the workers may be robots or various manned or unmanned vehicles.

In the above, the embodiments are described as examples of the techniques in the present disclosure. For that purpose, the accompanying drawings and the detailed description are provided.

Therefore, the components illustrated in the accompanying drawings and described in the detailed description not only include components essential for solving the problem but also can include, to exemplify the techniques, components that are not essential for solving the problem. For this reason, it should not be immediately recognized that those unnecessary components are necessary only because those unnecessary components are described in the accompanying drawings or the detailed description.

The present disclosure is applicable to data analysis for analyzing works for each worker in various environments such as a distribution site or a factory.

What is claimed is:

1. A work analysis device for generating information on works performed by at least one worker in a workplace, the work analysis device comprising:

a storage configured to store map information indicating an area associated with each of the works in the workplace;

an acquisition circuitry configured to acquire image data indicating an image of the workplace, the image being captured by a camera;

an image recognizer configured to perform image recognition recognizing positions of the at least one worker at each time in the workplace based on the acquired image data to generate position information including the recognized positions; and a controller configured to perform arithmetic processing to discriminate the works of the at least one worker at each time based on the position information and the map information, wherein the controller is further configured to:

generate probability information indicating a probability that a work is performed by the at least one worker based on the position information, the work being associated with an area including positions of the at least one worker at each time in the map information, the probability information being generated in association with a recognition result at each time by the image recognition; and adjust the probability information according to work tendency information indicating a tendency for the at least one worker to perform the works in the workplace.

2. The work analysis device according to claim 1, wherein when positions of the at least one worker are included in a specific area associated with two or more works in the map information, the controller is configured to adjust the probability information to differentiate probabilities related to the two or more works from each other according to the work tendency information.

3. The work analysis device according to claim 2, wherein when positions of the at least one worker are included in the specific area in the map information, the controller is configured to adjust a probability related to a work of each of the at least one worker according to the work tendency information.

4. The work analysis device according to claim 1, wherein;

the work tendency information includes information indicating a standard work period set to a first work of the works; and the controller is configured to reduce a probability related to the first work when a period for the first work exceeds the standard work period, the period for the first work being a period in which positions of the at least one worker are included in an area associated with the first work.

5. The work analysis device according to claim 1, wherein:

the work tendency information includes information indicating a maximum number of workers who perform a second work of the works in parallel; and when a number of workers at positions included in an area associated with the second work exceeds the maximum number of workers, the controller is configured to change a probability related to the second work for each of the workers.

6. The work analysis device according to claim 5, wherein;

the work tendency information includes assignment information in which the area associated with the second work is associated with the workers; and when the positions of the workers are included in the area associated in the assignment information, the controller is configured to adjust a probability related to a work associated with the area associated in the assignment information.

7. The work analysis device according to claim 5, wherein:

the position information includes information indicating a time when at least two of the workers arrive at the area; and when a number of workers at positions included in the area associated with the second work exceeds the maximum number of workers, the controller is configured to increase probabilities for workers arriving at the area earlier among the at least two workers.

8. The work analysis device according to claim 1, wherein:

the work tendency information includes information indicating an order in a combination of at least two of the works; and the controller is configured to adjust a probability related to each work in the combination according to the order.

9. The work analysis device according to claim 1, wherein based on the probability information for a predetermined period, the controller is configured to generate information indicating a ratio of the works over the predetermined period for each of the at least one worker.

10. A work analysis method for generating information on works performed by at least one worker in a workplace, the work analysis method being performed by a controller included in a computer, the computer including a storage configured to store map information indicating an area associated with each of the works in the workplace, the work analysis method comprising:

acquiring image data indicating an image of the workplace, the image being captured by a camera;

performing image recognition recognizing positions of the at least one worker at each time in the workplace based on the acquired image data to generate position information including the recognized positions;

generating, based on the position information, probability information indicating a probability that a work is performed by the at least one worker, the work being associated with an area including positions of the at least one worker at each time in the map information, the probability information being generated in association with a recognition result at each time by the image recognition; and adjusting the probability information according to work tendency information indicating a tendency for the at least one worker to perform the works in the workplace.

11. A non-transitory computer-readable medium having a program stored thereon for causing a controller of a computer to execute the work analysis method according to claim 10.

12. A work analysis system comprising:

the work analysis device according to claim 1; and an information presentation device configured to acquire the probability information from the work analysis device and display the acquired probability information.

13. The work analysis system according to claim 12, wherein the information presentation device includes:

a communication circuitry configured to perform data communication with the work analysis device;

an operation interface configured to receive a user operation inputting designation information indicating at least one of a time in the workplace or the at least one worker;

a controller configured to cause the communication circuitry to transmit the designation information to the work analysis device in accordance with the user operation and receive the probability information according to the designation information from the work analysis device; and a display configured to display the probability information according to the designation information.

14. An information presentation device for acquiring the probability information from the work analysis device according to claim 1 and displaying the acquired probability information, the information presentation device comprising:

a communication circuitry configured to perform data communication with the work analysis device;

an operation interface configured to receive a user operation inputting designation information indicating at least one of a time in the workplace or the at least one worker;

a controller configured to cause the communication circuitry to transmit the designation information to the work analysis device in accordance with the user operation and receive the probability information according to the designation information from the work analysis device; and a display configured to display the probability information according to the designation information.

* * * * *